(12) United States Patent
Hartnell et al.

(10) Patent No.: US 8,323,708 B2
(45) Date of Patent: Dec. 4, 2012

(54) POULTRY MEAT AND EGGS COMPRISING BENEFICIAL FATTY ACIDS

(75) Inventors: Gary F. Hartnell, St. Peters, MO (US); Virginia M. Ursin, Pawcatuck, CT (US)

(73) Assignee: Monsanto Technology LLC, St. Louis, MO (US)

( * ) Notice: Subject to any disclaimer, the term of this patent is extended or adjusted under 35 U.S.C. 154(b) by 498 days.

(21) Appl. No.: 12/404,665

(22) Filed: Mar. 16, 2009

(65) Prior Publication Data

US 2010/0233313 A1   Sep. 16, 2010

(51) Int. Cl.
*A23K 1/18*  (2006.01)
(52) U.S. Cl. ............................................. 426/2; 426/644
(58) Field of Classification Search ............... 426/2, 644
See application file for complete search history.

(56) References Cited

U.S. PATENT DOCUMENTS

| | | |
|---|---|---|
| 6,716,460 B2 | 4/2004 | Abril |
| 7,163,960 B2 | 1/2007 | Ursin et al. |
| 2003/0000477 A1 | 1/2003 | Abril |
| 2006/0110521 A1 | 5/2006 | Heise et al. |
| 2006/0111254 A1 | 5/2006 | Makadia et al. |
| 2006/0111578 A1 | 5/2006 | Arhancet et al. |
| 2007/0004678 A1 | 1/2007 | Kohn et al. |
| 2008/0032335 A1 | 2/2008 | Shimizu et al. |

FOREIGN PATENT DOCUMENTS

| | | | |
|---|---|---|---|
| WO | 2005021761 A1 | | 3/2005 |
| WO | 2008085841 A1 | | 7/2008 |
| WO | WO 2008150892 | * | 12/2008 |
| WO | 2009073397 A1 | | 6/2009 |

OTHER PUBLICATIONS

Patricia C. Allen and Harry D. Danforth. (1998), Effects of Dietary Supplementation with n-3 Fatty Acid Ethyl Esters on Coccidiosis in Chickens, Poultry Science 77:1631-1635.
Ajuyah, A.O.; K.H. Lee; R.T. Hardin and J.S. Sim. (1991), Changes in the yield and in the fatty acid composition of whole carcass and selected meat portions of broiler chickens fed full-fat oil seeds. Poultry Science, 70:2304-2314.
Arachchige Premakumara G.; Takahashi Yoko; Ide Takashi. (2006), Dietary Sesamin and Docosahexaenoic and Eicosapentaenoic Acids Synergistically Increase the Gene Expression of Enzymes Involved in Hepatic Peroxisomal Fatty Acid Oxidation in Rats. Metab. Clin. Exp., 55:381-90.
Whelan, J. and Rust, C., (May 9, 2006) "Innovative dietary sources of N-3 fatty acids," Annu. Rev. Nutr., vol. 26, pp. 75-103.
Harris WS, DiRienzo MA, Sands SA, George C, Jones PG, and Eapen, AK (2007) Stearidonic Acid Increases the Red Blood Cell and Heart Eicosapentaenoic Acid Content in Dogs, Lipids 42:325-33.
James, M.J., Ursin V.M., and Cleland L.G. (2003) Metabolism of stearidonic acid in human subjects: comparison with the metabolism of other n-3 fatty acids. Am J Clin Nutr 2003;77:1140-5.
Klasing, K.C. and Leshchinsky, T.V., (2000), Interactions Between Nutrition and Immunity. Lessons From Animal Agriculture. In:
Nutrition and Immunology: Principles and Practice. (M.E. Gershwin, J.B. Germanand, C.L.Keen (Eds)). Elsevier. pp. 363-373.
Krasicka, B.; Kulasek, G.W.; Swierczewska E.; and Orzechowski, A. (2000). Body gains and fatty acid composition in carcasses of broilers fed diets enriched with full-fat rapesee and/or flaxseed, Arch. GefhηGelk., 64:61-69.
Krokhan HE, Bjerve KS, Mork E. 1993. The enteral bioavailability of eicosapentaenoic acid and docosahexaenoic acid is as good from ethyl esters as from glyceryl esters in spite of lower hydrolytic rates by pancreatic lipase in vitro. Biochim Biophys Acta, May 20, 1993;1168(1):59-67.
Lawson, L.D. and Hughs, B.G. (1998) Absorption of eicosapentaenoic acid and docosahexaenoic acid from fish oil triacylglycerols or fish oil ethyly esters co-ingested with a high-fat meal, Biochemical and Biophysical Research Communications 156(2):960-963.
Lôpez-Ferrer, S. M.D. Baucells, A.C. Barrota, J. Galobart, and M.A. Grashorn. (2001). (n-3 enrichment of chicken meat.) Use of precursors of long-chain polyunsaturated fatty acids in Linseed oil, Poultry Science 80:753-761.
Martínez M. et al., (2000), Therapeutic effects of docosahexaenoic acid ethyl ester in patients with generalized peroxisomal disorders. American Journal of Clinical Nutrition, vol. 71, No. 1, 376S-385S.
Mattos R., CR Staples, and WW Thatcher, Effects of Dietary Fatty Acids on Reproduction in Ruminants, (2000), Reviews of Reproduction 5:38-45.
Miles EA, Banerjee T. and Calder, P.C. (2004), The influence of different combinations of gamma-linolenic acid, stearidonic acid and EPA on immune function in healthy young male subjects. Br J Nutr. Jun. 2004;91(6):893-903.
Napier, Johnathan. (2007) The Production of Unusual Fatty Acids in Transgenic Plants. Annu. Rev. Plant Biol., 2007 58:295-319.
Sun-Young Lim and Hiramitsu Suzuki. (2000), Intakes of Dietary Docosahexaenoic Acid Ethyl Ester and Egg Phosphatidylcholine Improve Maze-Learning Ability in Young and Old Mice. Journal of Nutrition. 2000;130:1629-1632.
Ursin G. et al., (2003), Modification of plant lipids for human health: Development of functional land-based omega-3 fatty acids. J. Nutr. 133:4271-4274.
Rule, D.C., et al., (Jan. 1, 2002) "Comparison of muscle fatty acid profiles and cholesterol concentrations of bison, beef cattle, elk, and chicken," Journal of Animal Science, American Society of Animal Science, vol. 80, No. 5, pp. 1202-1211.

(Continued)

*Primary Examiner* — D. Lawrence Tarazano
*Assistant Examiner* — Hamid R Badr
(74) *Attorney, Agent, or Firm* — Senniger Powers LLP; Byron V. Olsen

(57) ABSTRACT

The present disclosure provides for improved poultry products and methods of producing such poultry products by incorporating healthy lipids containing stearidonic acid into animal feed products. Furthermore, the present disclosure provides methods for producing said products. In one embodiment of the disclosure, a poultry animal may be fed feed comprising a transgenic plant product. In other embodiments of the disclosure, poultry white meat and dark meat products comprising SDA, EPA, DPA, and DHA are disclosed. In further embodiments of the disclosure, poultry eggs comprising SDA, EPA, DHA, and DPA are disclosed.

21 Claims, No Drawings

OTHER PUBLICATIONS

Betti, et al., Omega-3-enriched broiler meat: 3. Fatty acid distribution between triacylglycerol and phospholipid classes, Processing, Products, and Food Safety, Poultry Science Association Inc., 1740-1754, (2009).

International Search Report and Written Opinion from PCT/US2009/037252 mailed Jan. 3, 2010.

Calder, P.C. and Field, C.J. (2002). Fatty Acids, Inflammation and Immunity. In: Nutrition and Immune Function, (P.C. Calder, C.J. Field and H.S. Gill (Eds)). CABI Publishing. pp. 57-92.

Yamazaki et al., Comparison of the conversion rates of alpha-linolenic acid (18:3(n-3)) and stearidonic acid (18:4(n-3)) to longer polyunsaturated fatty acids in rats. Biochim Biophys Acta., Jan. 3, 1992;1123(1):18-26.

Kitessa et al., Echium oil is better than rapeseed oil in enriching poultry meat with n-3 polyunsaturated fatty acids, including eicosapentaenoic acid and docosapentaenoic acid, British Journal of Nutrition, 101:709-715, (2009).

\* cited by examiner

POULTRY MEAT AND EGGS COMPRISING BENEFICIAL FATTY ACIDS

FIELD OF THE DISCLOSURE

The disclosure relates to the enhancement of desirable characteristics in poultry or poultry products through the incorporation of beneficial fatty acids in animal feed or in animal feed supplements. More specifically, it relates to methods of production and processing of poultry products comprising polyunsaturated fatty acids including stearidonic acid.

BACKGROUND OF THE DISCLOSURE

The present disclosure is directed to a method for improving poultry tissues or the meat and eggs produced therefrom through the utilization of plant-derived stearidonic acid ("SDA") or SDA oil in animal feed. Specifically, the inventors provide techniques and methods for the utilization of transgenic plant-derived SDA compositions in feed products that improve the nutritional quality of poultry derived products or in the productivity of the animals themselves.

Many studies have made a physiological link between dietary fats and pathologies such as obesity and atherosclerosis. In some instances, consumption of fats has been discouraged by the medical establishment. More recently, the qualitative differences between dietary fats and their health benefits have been recognized.

Recent studies have determined that despite their relatively simple biological structures there are some types of fats that appear to improve body function in some ways and that may, in fact, be essential to certain physiological processes. The wider class of fat molecules includes fatty acids, isoprenols, steroids, other lipids and oil-soluble vitamins. Among these are the fatty acids. The fatty acids are carboxylic acids, which have from 2 to 26 carbon atoms in their "backbone," with none or few desaturated sites in their carbohydrate structure. They generally have dissociation constants (pKa) of about 4.5 indicating that in normal body conditions (physiological pH of 7.4) the vast majority will be in a dissociated form.

With continued experimentation workers in the field have begun to understand the nutritional need for fats and in particular fatty acids in the diet. For this reason, many in the food industry have begun to focus on fatty acids and lipid technology as a new focus for food production, with its consequent benefits for the animals consuming the modified feed and in products derived from those animals for human consumption. This focus has been particularly intense for the production and incorporation of omega-3 fatty acids into the diet. Omega-3 fatty acids are long-chain polyunsaturated fatty acids (18-22 carbon atoms in chain length) with the first of the double bonds ("unsaturations") beginning with the third carbon atom from the methyl end of the molecule. They are called "polyunsaturated" because their molecules have two or more double bonds "unsaturations" in their carbohydrate chain. They are termed "long-chain" fatty acids since their carbon backbone has at least 18 carbon atoms. In addition to stearidonic acid "SDA" the omega-3 family of fatty acids includes alpha-linolenic acid ("ALA"), eicosatetraenoic acid (ETA), eicosapentaenoic acid ("EPA"), docosapentaenoic acid (DPA), and docosahexaenoic acid ("DHA"). ALA can be considered a "base" omega-3 fatty acid, from which EPA and DHA are made in the body through a series of enzymatic reactions, including the production of SDA. Most nutritionists point to DHA and EPA as the most physiologically important of the omega-3 fatty acids with the most beneficial effects. However, SDA has also been shown to have significant health benefits. See for example, U.S. Pat. No. 7,163,960 herein incorporated by reference.

The synthesis processes from ALA is called "elongation" (i.e., the molecule becomes longer by incorporating new carbon atoms) and "desaturation" (i.e., new double bonds are created), respectively. In nature, ALA is primarily found in certain plant leaves and seeds (e.g., flax) while EPA and DHA mostly occur in the tissues of cold-water predatory fish (e.g., tuna, trout, sardines and salmon), and in some marine algae or microbes that they feed upon.

Along with the movement of food companies to develop and deliver essential fats and oils as an important component in a healthy human diet, governments have begun developing regulations pushing for the adoption of PUFA's in the diet. The difficulty in supplying these needs has been the inability to develop a large enough supply of omega-3 oil to meet growing marketplace demand. As already mentioned, the omega-3 fatty acids commercially deemed to be of highest value, EPA and DHA, which are provided in marine sources, also chemically oxidize very quickly over time limiting commercial availability. Importantly, during the rapid process of EPA and DHA degradation these long chain fatty acids develop rancid and profoundly unsatisfactory sensory properties (e.g., fishy odor and taste) that make their inclusion in many foodstuffs difficult or impossible from a commercial acceptance perspective. Furthermore, as typical poultry products are cooked at least once and more often, at least twice (i.e., initially by the manufacture and then reheated by the consumer), oxidation of the EPA and DHA is even further increased, resulting in an even more unsatisfactory sensory product.

In addition, with increased demand for omega-3 fatty acids has come the realization that already depleted global fish stocks cannot meet any significant growth in future human nutritional needs for omega-3's. These limitations on supply, stability and sourcing greatly increase cost and correspondingly limit the availability of dietary omega-3's.

Suboptimal nutrition and growth are limiting factors in animal productivity. Basic information regarding these processes in agriculturally important animals, including common commercial poultry, is lacking. New knowledge in these areas is needed to improve animal production and control muscling, growth, reproductive capacity and metabolism. Research is also needed to identify biological mechanisms for increasing dietary nutrient availability, directing nutrient partitioning toward more protein and less fat, enhancing nutrient composition in animal products, and minimizing excretion of nutrients as waste products. It is also desirable to develop a system that is capable of determining if a particular feed is useful in enhancing animal productivity. Examples of suitable evaluation criteria include a feed cost per unit animal weight gain basis, an animal production rate basis (e.g., based upon a rate of animal weight gain or a rate of production of an animal product, such as milk or eggs), and a feed amount per unit of animal weight gain basis.

Metabolic modifiers, such as certain fatty acids, are a group of compounds that modify animal metabolism in specific and directed ways if provided in the diet. Metabolic modifiers generally have the overall effect of improving productive efficiency (e.g., weight gain or milk yield per feed unit), improving carcass composition (e.g., meat-to-fat ratio) in growing animals, increasing milk yield in lactating animals and decreasing animal waste. Prior research has indicated that supplementation with certain dietary fatty acids, acting as metabolic modifiers, can enhance animal productivity (Calder (2002); Klasing (2000); and, Mattos (2000)).

Accordingly a need exists to enhance the nutritional quality and productivity of farm animals and products produced therefrom. The SDA compositions of the current disclosure not only provide needed dietary fat for specific animal species, including poultry, but also provide other dietary improvements for the commercial production of animals as well as gains in animal productivity. The feed compositions of the current disclosure comprise SDA compositions that can be used in producing an enhanced feed for poultry containing the SDA compositions of the disclosure.

In addition, a need exists to provide a consumer acceptable means of delivering EPA and DHA or critical precursors in food formulations in a commercially acceptable way. The current disclosure provides an alternative to fish or microbe-supplied omega-3 fatty acids in the form of poultry meat and eggs comprising beneficial omega-3 fatty acids and does so utilizing a comparatively chemically stable omega-3 fatty acid, SDA, as a source that offers improved cost-effective production and abundant supply as derived from transgenic plants.

According to embodiments of the current disclosure, the preferred plant species that could be modified to reasonably supply demand are: soybeans, corn, and canola, but other many plants could also be included as needed and as scientifically practicable. Once produced, the SDA of the disclosure can be used to improve the health characteristics of a great variety of food products. This production can also be scaled-up as needed to both reduce the need to harvest wild fish stocks and to provide essential fatty acid (FA) components for aquaculture operations, each greatly easing pressure on global fisheries.

Previous attempts to increase the concentration of beneficial fatty acids in poultry have included supplementing the diet of the poultry with ALA, EPA, or DHA. Omega-3 fatty acids have been investigated as a potential way to improve performance and meat quality in pigs and poultry. In the literature, some trials indicated positive responses and others indicated that there may be negative responses in growth response to omega-3 FA. The disparity of growth performance response was largely due to differences in source of the omega-3 FA and in the other dietary FA present. In reviewing the previous research, it was apparent that under extreme immune pressure the likelihood of a positive growth response to omega-3 FA was increased. The immune data suggest that a balanced omega-3 and omega-6 FA diet provides for the optimal immune function, but the most appropriate balance has not been identified.

Some attempts at incorporation of omega-3 fatty acids into poultry products have been described in the art. However, existing methods include addition of highly unstable EPA or DHA which are less stable and more difficult to obtain; or incorporation of traditional omega-3 fatty acids such as alpha-linolenic acid (ALA), which are not converted to the beneficial forms efficiently enough to be practical. Nutritional studies have shown that, compared to ALA, SDA is 3 to 4 times more efficiently converted in vivo to EPA in humans. (Ursin, 2003).

Surprisingly, the inventors have found that feeding poultry SDA compositions from transgenic plant sources is highly effective in increasing the omega-3 fatty acid levels of SDA (18:4), ETA (omega-3 20:4), EPA (eicosapentaenoic acid), DPA (docosapentaenoic acid), DHA (docosahexaenoic acid) and decreases in the levels of the omega-6 fatty acids ARA (arachidonic acid), and docosatetraenoic acid (DTA, omega-6 22:4) and thereby improves the omega-6 to omega-3 fatty acid ratio. Furthermore, plant sources, such as soybean oil, have been found to provide more stable fatty acids to the product. Specifically, SDA soybean oil was shown to take 5 to 10 times longer to oxidize as measured by peroxide values and anisidine values as compared to fish oils in stability tests.

Previous research has shown little to no incorporation of SDA in humans. See for example James et al. (2003), Harris et al. (2007), and Miles et al. (2004).

Furthermore, there was greater incorporation of SDA into poultry meat when using the SDA soybean oil as compared to using the SDA ethyl ester. More particularly, it has been found that pancreatic lipase resistance (i.e., resistance to pancreatic lipase hydrolysis) results in lower absorption of fatty acids in humans. It has further been reported that all fatty acid ethyl esters seem to resist pancreatic lipase hydrolysis (Lawson, 1988). Accordingly, it is believed that this lipase resistance results in lower absorption of SDA into the poultry when using SDA ethyl ester as compared to SDA soybean oil.

Furthermore, the inventors have found unexpected decreases in, 18:1 (oleic acid) and (C18:2) in both breast and thigh meat with and without skin. Overall, the inventors believe this constitutes for a healthier composition of the fatty acid profile in chicken feed with SDA.

Furthermore, the inventors have found no significant difference in the palatability, flavor, tenderness, or overall consumer acceptability, as previously described using methods such as in U.S. Pat. No. 6,716,460. Additionally, the methods of the present disclosure do not require the administration of SDA from a concentrated source.

An improved ratio of omega-3 fatty acids in broilers is also accessible by feeding fish oil comprising DHA. However, the literature describes that such chicken meat is associated with undesirable side affects such as stability and taste and smell properties. Adverse taste, smell, and stability were not found in the methods and products of the present disclosure. SDA feed comprising whole foods, unlike the omega 3 fatty acids commonly described in the literature, is uniquely suited for feed compositions which yield healthy and stable poultry products.

A further advantage of feeding SDA over alpha linolenic acid (ALA) is that SDA circumvents the limiting reaction of the delta-6 desaturase and is therefore much more efficiently converted to the long chain PUFA's EPA, DPA, and DHA.

SUMMARY OF THE DISCLOSURE

The present disclosure encompasses incorporation of oil from transgenic plants engineered to contain significant quantities of stearidonic acid (18:4ω3) for use in poultry feed to improve the fatty acid profile of poultry, poultry products derived therefrom and/or the health of an end consumer. Sufficient quantities of stearidonic acid (SDA) enriched soybeans have been grown to allow the delivery of soybeans and soy oil with a substantial SDA component. According to embodiments of the current disclosure, the SDA soybeans of the disclosure provide enhanced nutritional quality relative to traditional omega-3 alternatives such as flaxseed and lack negative taste and low stability characteristics associated with fish oil. Therefore, a preferred embodiment of this disclosure comprises a poultry product with an increased level of beneficial polyunsaturated fatty acids such as SDA, EPA, DPA, and DHA. Surprisingly, significant amounts of SDA were incorporated into the poultry meat and eggs through feed supplemented with SDA.

Also according to the current disclosure, testing of poultry diets comprising stearidonic acid has also been conducted and the plant-derived SDA feed has substantially improved the fatty acid profile of the resulting poultry products. Therefore, a preferred embodiment of the current disclosure is the usage of the SDA oil produced by transgenic plants in the production of poultry feed.

In an additional embodiment of the disclosure, poultry products comprising SDA and DHA are disclosed including poultry meat and eggs. Furthermore, methods of making such products are disclosed.

In an additional embodiment of the disclosure, poultry products comprising SDA, EPA, and DHA are disclosed. Furthermore, methods of making such products are disclosed. These methods may include providing a stearidonic acid source comprising SDA, providing additional feed components, contacting said stearidonic acid source with said feed components to make a supplemented feed, feeding said supplemented feed to a plurality of poultry animals, harvesting at least one edible product for human consumption from said poultry animals, wherein said stearidonic acid source comprises a transgenic plant source, and wherein some portion of said SDA is incorporated in said edible product.

Exemplary stearidonic acid sources may include transgenic soybeans, transgenic soybean oil, transgenic soy protein, transgenic corn, and transgenic canola. Additional stearidonic acid sources may include seeds such as soybeans, safflower, canola, and corn.

In at least one embodiment, the SDA includes less than about 30% of the total fatty acids in the stearidonic acid source. Furthermore, the stearidonic acid source includes an omega-3 to omega-6 fatty acid ratio of greater than about 2:1.

Additionally, the stearidonic acid source may include 6-cis, 9-cis, 12-cis, 15-trans-octadecatetraenoic acid. In another embodiment, the stearidonic acid source may include 9-cis, 12-cis, 15-trans-alpha linolenic acid. In yet another embodiment, the stearidonic acid source may include 6,9-octadecadienoic acid.

In an additional embodiment of the disclosure, products comprising SDA, EPA, and DHA and having reduced omega-6 content are disclosed. Furthermore, methods of making such products are disclosed.

In some embodiments of the disclosure, minimum levels of specific fatty acids are found in poultry meat and eggs. The concentrations of beneficial fatty acids include the following ranges in the various chicken tissues identified:

SDA (Ethyl Ester)
  in breast meat (mg/100 g fatty acids): 500-3000 mg SDA/100 g fatty acids, 200-2000 mg EPA/100 g fatty acids, 500-3000 mg DPA/100 g fatty acids and 400-2000 mg DHA/100 g fatty acids;
  thigh/leg meat (mg/100 g fatty acids): 500-4,000 mg SDA/100 g fatty acids, 50-1000 mg EPA/100 g fatty acids, 150-1200 mg DPA/100 g fatty acids, and 50-400 mg DHA/100 g fatty acids; and
  eggs (mg/100 g of egg): 10-25 mg SDA/100 g, 10 25 mg EPA/100 g, 35-60 mg/100 g DPA/100 g and 150-185 mg DHA/100 g.

SDA (SDA Soy Oil)
  in breast meat (mg/100 g fatty acids): 1000-20000 mg SDA/100 g fatty acids, 200-4000 mg EPA/100 g fatty acids, 500-4000 mg DPA/100 g fatty acids and 400-2000 mg DHA/100 g fatty acids;
  thigh/leg meat (mg/100 g fatty acids): 500-4,000 mg SDA/100 g fatty acids, 200-3000 mg EPA/100 g fatty acids, 500-4000 mg DPA/100 g fatty acids, and 100-1500 mg DHA/100 g fatty acids.

According to a preferred embodiment of the disclosure, poultry products comprising minimum concentrations of fatty acids are described and provided. Preferably, the poultry meat product comprises a concentration of SDA being at least about 0.5%, a concentration of EPA being at least about 0.15%, and the concentration of DHA being at least about 0.10%, of the total fatty acid content of the poultry product. Preferably, the SDA concentration is at least about 0.70, and more preferably 5.0% of the total fatty acid content of the poultry meat product.

According to a preferred embodiment of the disclosure, poultry white meat products comprising minimum concentrations of fatty acids are provided. Preferably, the poultry white meat product comprises a concentration of SDA being at least about 0.50%, a concentration of EPA being at least about 0.2%, and the concentration of DHA being at least about 0.2%, of the total fatty acid content of the poultry product. Preferably, the SDA concentration is at least about 0.3%, and more preferably at least about 0.5%, even more preferably at least about 0.8%, and even more preferably at least about 5.0%, and yet more preferably at least about 10% of the total fatty acid content of the poultry meat product. Furthermore, the poultry white meat product may comprise DPA at a concentration of at least about 0.2% of the fatty acid content, more preferably at least about 0.3%, and EPA at a concentration of at least about 0.2% of the fatty acid content, and more preferably at least about 0.3%. Preferably, the poultry white meat product further comprises GLA, and the GLA concentration is at least about 0.2% of the total fatty acid content, more preferably at least about 0.5%, at least about 1.0%, and at least about 2.5%. Preferably, the poultry white meat product further comprises ALA at a concentration of at least about 0.1% of the fatty acid content. Preferably, the poultry white meat product comprises chicken meat or turkey meat. Most preferably, the poultry white meat product comprises chicken breast meat.

According to a preferred embodiment of the disclosure, poultry white meat products comprising unique fatty acid ratios are provided. Preferably, the ratio of SDA/ALA is at least about 1.0; the ratio of SDA/DHA is at least about 1.0, more preferably at least about 2.5; the ratio of DHA/ALA is at least about 0.05; the ratio of DHA/ALA is less than about 3.0; the ratio of DHA/EPA is at least about 0.1, more preferably at least about 1.0; the ratio of DHA/EPA is less than about 3.0; and the ratio of SDA/18:2 is at least about 0.03. Preferably, the white meat also comprises tocols; preferably at least about 1oppm tocochromanols, more preferably at least about 10 ppm tocopherols. More preferably, the white meat comprises tocopherols. Furthermore, the concentration of ETA is preferably at least about 0.01% of the fatty acid content, more preferably at least about 0.05%.

According to another preferred embodiment of the disclosure, poultry dark meat products comprising minimum concentrations of fatty acids are provided. Preferably, the poultry dark meat product comprises a concentration of SDA being at least about 0.3%, a concentration of EPA being at least about 0.1%, and the concentration of DHA being at least about 0.1%, of the total fatty acid content of the poultry product. Preferably, the SDA concentration is at least about 0.90%, and more preferably 5.0%, and yet more preferably 10.0% of the total fatty acid content of the poultry meat product. Furthermore, the poultry dark meat product may comprise DPA at a concentration of at least about 0.2% of the fatty acid content. Preferably, the poultry dark meat product further comprises GLA, and the GLA concentration is at least about 0.10% of the total fatty acid content, more preferably at least about 0.15%, at least about 0.5%, at least about 1.0%, at least about 2.0%, and at least about 2.5%. Preferably, the poultry dark meat product further comprises ALA at a concentration of at least about 0.1% of the fatty acid content. Preferably, the poultry dark meat product comprises chicken meat, turkey meat, duck meat, or goose meat. Most preferably, the poultry dark meat product comprises chicken thigh meat.

According to an additional preferred embodiment of the disclosure, poultry dark meat products comprising unique fatty acid ratios are described. Preferably, the ratio of SDA/ALA is at least about 1.0; the ratio of SDA/DHA is at least about 1.0; the ratio of SDA/GLA is at least about 1.3; the ratio of DHA/ALA is at least about 0.05; the ratio of DHA/ALA is less than about 3.0; the ratio of DHA/EPA is at least about 0.1, more preferably at least about 0.3, and even more preferably at least about 1.0; the ratio of DHA/EPA is less than about 3.0; and the ratio of SDA/18:2 is at least about 0.03. Preferably, the dark meat also comprises tocols. More preferably, the dark meat comprises at least about 10 ppm tocochromanols, more preferably at least about 10 ppm tocopherols. Furthermore, the concentration of ETA is preferably at least about 0.03%.

According to another preferred embodiment of the disclosure, poultry egg products comprising minimum concentrations of fatty acids are provided. Preferably, the poultry egg product comprises SDA, EPA, and DHA. More preferably, the poultry egg product comprises a concentration of SDA being at least about 0.01%, more preferably at least about 0.05%, and yet more preferably at least about 0.10%, a concentration of EPA being at least about 0.01%, and the concentration of DHA being at least about 0.15%, of the egg product. Preferably, the poultry egg product further comprises at least about 0.35% of DPA. Preferably, the poultry egg product further comprises ALA. Preferably, the poultry egg product is a chicken egg.

According to other embodiments of the disclosure, a poultry egg product comprising SDA, EPA, and DHA with unique ratios of fatty acids is described. Preferably, the ratio of SDA/ALA is at least about 0.1; the ratio of SDA/DHA is less than about 0.05; and the ratio of DHA/ALA is at least about 2.0. Preferably, the egg also comprises at least about 0.35% DPA. Preferably, the egg also comprises tocols; preferably at least about 10 ppm tocochromanols, more preferably at least about 10 ppm tocopherols.

Additional embodiments of the present disclosure include a method of producing a poultry product for human consumption comprising: providing a stearidonic acid source comprising stearidonic acid (SDA), providing additional feed components, contacting said stearidonic acid source with said feed components to make a supplemented feed, feeding said supplemented feed to a plurality of poultry animals, harvesting at least one edible product for human consumption from said poultry animals, and wherein said stearidonic acid source comprises a transgenic plant source and wherein at least a portion of said SDA is incorporated in said edible product.

In an additional embodiment, a poultry feed comprising SDA, GLA, and additional feed components is described. Preferably, the poultry feed comprises at least about 0.3% SDA, and more preferably at least about 0.5% SDA and at least about 0.05%, and more preferably at least about 0.1% GLA. In one embodiment, the SDA concentration is less than about 35% of the total fatty acids in the feed, more preferably less than about 25%, less than about 15%, and less than about 5%. In yet another embodiment, poultry feed comprises SDA and GLA, wherein the ratio of SDA/GLA is at least about 1.3, and in some embodiments, at least about 1.5. In preferred embodiments, the poultry feed comprises a transgenic plant product selected from the group consisting of transgenic soybeans, transgenic soybean oil, transgenic soy protein, transgenic corn, and transgenic canola. In alternative embodiments of this disclosure, the poultry feed further comprises ALA and eicosenoic acid. In preferred embodiments of this disclosure, the ALA concentration is less than about 25% and the ratio of SDA/ALA is at least about 0.5. In further preferred embodiments of this disclosure, the eicosenoic acid concentration is less than about 0.7% and the ratio of SDA/eicosenoic acid is at least about 20.

In an additional embodiment of the disclosure, a food product for human consumption comprises a poultry product comprising SDA, EPA, ETA, and DHA.

Other features and advantages of this disclosure will become apparent in the following detailed description of preferred embodiments of this disclosure, taken with reference to the accompanying figures.

DEFINITIONS

The following definitions are provided to aid those skilled in the art to more readily understand and appreciate the full scope of the present disclosure. Nevertheless, as indicated in the definitions provided below, the definitions provided are not intended to be exclusive, unless so indicated. Rather, they are preferred definitions, provided to focus the skilled artisan on various illustrative embodiments of the disclosure.

As used herein the term "poultry product" refers to food products comprising the meat or eggs of poultry animals.

As used herein, the term "poultry meat product" refers to food products comprising a portion of meat from a poultry animal.

As used herein, the term "poultry white meat" refers to lighter meats such as chicken and turkey breasts which have reduced myoglobin content in comparison with poultry dark meat. Poultry white meat describes skinless boneless poultry flesh which is primarily muscle tissue.

As used herein, the term "poultry dark meat" refers to darker poultry meats such as chicken or turkey thighs and legs, as well as goose or duck meat; which generally have a higher myoglobin content than poultry white meat. Unlike poultry white meat, poultry dark meat may also contain attached skin, as is commonly practiced in the industry.

As used herein, the term "poultry egg product" refers to food products comprising at least a portion of a poultry egg.

"Poultry" or "poultry animal" refers to any avian species that is used as a food source for human consumption. Exemplary poultry include chickens, turkeys, Cornish game hens, pheasants, quails, ducks, geese, and pigeons. Preferably, poultry is selected from the group consisting of a chicken and turkey, and more preferably a broiler chicken.

DETAILED DESCRIPTION OF THE DISCLOSURE

Production of SDA:

The present disclosure relates to a system for an improved method for the plant based production of stearidonic acid and its incorporation into the diets of humans and livestock in an effort to improve human health. This production is made possible through the utilization of transgenic plants engineered to produce SDA in sufficiently high yield so as to allow commercial incorporation into food products. For the purposes of the current disclosure the acid and salt forms of fatty acids, for instance, butyric acid and butyrate, arachidonic acid and arachidonate, will be considered interchangeable chemical forms.

All higher plants have the ability to synthesize the main 18 carbon PUFA's, LA and ALA, and in some cases SDA (C18: 4n3, SDA), but few are able to further elongate and desaturate these to produce arachidonic acid (AA), EPA or DHA. Synthesis of EPA and/or DHA in higher plants therefore requires the introduction of several genes encoding all of the biosynthetic enzymes required to convert LA into AA, or ALA into EPA and DHA. Taking into account the importance of PUFAs in human health, the successful production of PUFAs (especially the n-3 class) in transgenic oilseeds, according to the current disclosure can then provide a sustainable source of these essential fatty acids for dietary use. The "conventional" aerobic pathway which operates in most PUFA-synthesizing eukaryotic organisms, starts with Δ6 desaturation of both LA and ALA to yield γ-linolenic (GLA, 18:3n6) and SDA.

Turning to Table 1, it is important to provide a basis of what constitutes "normal" ranges of oil composition vis-à-vis the oil compositions of the current disclosure. A significant source of data used to establish basic composition criteria for edible oils and fats of major importance has been the Ministry of Agriculture, Fisheries and Food (MAFF) and the Federation of Oils, Seeds and Fats Associations (FOSFA) at the Leatherhead Food Research Association facility in the United Kingdom.

To establish meaningful standards data, it is essential that sufficient samples be collected from representative geographical origins and that these oils are pure. In the MAFF/FOSFA work, over 600 authentic commercial samples of vegetable oilseeds of known origin and history, generally of ten different geographical origins, were studied for each of 11 vegetable oils. The extracted oils were analyzed to determine their overall fatty acid composition ("FAC"). The FAC at the 2-position of the triglyceride, sterol and tocopherol composition, triglyceride carbon number and iodine value, protein values in the oil, melting point and solid fat content as appropriate are determined.

Prior to 1981, FAC data were not included in published standards because data of sufficient quality was not available. In 1981, standards were adopted that included FAC ranges as mandatory compositional criteria. The MAFF/FOSFA work provided the basis for later revisions to these ranges.

In general, as more data became available, it was possible to propose fatty acid ranges much narrower and consequently more specific than those adopted in 1981. Table 1 gives examples of FAC of oils that were adopted by the Codex Alimentarius Commission (CAC) in 1981 and ranges for the same oils proposed at the Codex Committee on Fats and Oils (CCFO) meeting held in 1993.

porate products of transgenic plants such as transgenic soybean oil. Transgenic plants and methods for creating such transgenic plants can be found in the literature. See for example, WO2005/021761A1. As shown in Table 2, the composition of the transgenic soy oil is substantially different than that of the accepted standards for soy oil.

TABLE 2

A comparison of transgenic soy oil and traditional soy oil fatty acid compositions (% of Oil)

|  | High SDA Soy Oil | Medium SDA Soy Oil | Low SDA Soy Oil |
|---|---|---|---|
| C14:0 (Myristic) | 0.1 | 0.1 | 0.1 |
| C16:0 (Palmitic)) | 12.5 | 12.3 | 12.1 |
| C16:1 (Palmitoleic) | 0.1 | 0.1 | 0.1 |
| C18:0 (Stearic) | 4.2 | 4.6 | 4.2 |
| C18:1 (Oleic) | 16.0 | 18.7 | 19.4 |
| C18:2 (Linoleic) | 18.5 | 23.9 | 35.3 |
| C18:3 n6 (Gamma Linolenic) | 7.2 | 6.4 | 4.9 |
| C18:3 n3 (Alpha-Linolenic) | 10.3 | 10.8 | 10.1 |
| C18:4 n3 (Stearidonic) | 28.0 | 20.5 | 11.4 |
| C20:0 (Arachidic) | 0.4 | 0.4 | 0.4 |
| C20:1 (Eicosenoic) | 0.3 | 0.2 | 0.4 |
| C22:0 (Behenic) | 0.3 | 0.3 | 0.4 |
| C24:0 (Lignoceric) | 0.1 | 0.1 | 0.1 |
| 6-cis, 9-cis, 12-cis, 15-trans-octadecatetraenoic acid | <0.2% | <0.2% | <0.2% |
| 9-cis, 12-cis, 15-trans-alpha linolenic acid | <0.2% | <0.2% | <0.2% |
| 6,9-octadecadienoic acid | <0.2% | <0.2% | <0.2% |
| Total trans-fatty acid | 1.5 | 1.2 | 0.9 |
| Other fatty acids | 0.6 | 0.6 | 0.3 |

Given the above and according to the current disclosure, the SDA rich soybeans produced in a recombinant oilseed plant provides a composition not previously available for feed manufacturers. It provides for the incorporation of seeds into poultry feed with a unique fatty acid profile that was not present in appreciable amounts in typical feeds prior to the current disclosure. In addition the use of this feed is made possible without the traditional concerns with stability when oils comprising DHA are delivered from a fish or algal source. The feed incorporating such transgenic plant seeds can be further utilized for the production of food products including poultry products having enhanced nutritional content.

TABLE 1

Standards For Fatty Acid Composition Of Oils (% Of Oil)

| Fatty acid | Soybean oil | | Groundnut oil | | Cottonseed oil | | Sunflower-seed oil | |
|---|---|---|---|---|---|---|---|---|
|  | 1981 | 1993 | 1981 | 1993 | 1981 | 1993 | 1981 | 1993 |
| C14:0 | <0.5 | <0.2 | <0.6 | <0.1 | 0.4-2 | 0.6-1 | <0.5 | <0.2 |
| C16:0 | 7-14 | 8-13.3 | 6-16 | 8.3-14 | 17-31 | 21.4-26.4 | 3-10 | 5.6-7.6 |
| C16:1 | <0.5 | <0.2 | <1 | <0.2 | 0.5-2 | 0-1.2 | <1 | <0.3 |
| C18:0 | 1.4-5.5 | 2.4-5.4 | 1.3-6.5 | 1.9-4.4 | 1-4 | 2.1-3.3 | 1-10 | 2.7-6.5 |
| C18:1 | 19-30 | 17.7-26.1 | 35-72 | 36.4-67.1 | 13-44 | 14.7-21.7 | 14-65 | 14-39.4 |
| C18:2 | 44-62 | 49.8-57.1 | 13-45 | 14-43 | 33-59 | 46.7-58.2 | 20-75 | 48.3-74 |
| C18:3 | 4-11 | 5.5-9.5 | <1 | <0.1 | 0.1-2.1 | 0-0.4 | 0-0.7 | 0-0.2 |
| C20:0 | <1 | 0.1-0.6 | 1.3 | 1.1-1.7 | 0-0.7 | 0.2-0.5 | 0-1.5 | 0.2-0.4 |
| C20:1 | <1 | <0.3 | 0.5-2.1 | 0.7-1.7 | 0-0.5 | 0-0.1 | 0-0.5 | 0-0.2 |
| C22:0 | <0.5 | 0.3-0.7 | 1-5 | 2.1-4.4 | 0-0.5 | 0-0.6 | 0-1 | 0.5-1.3 |
| C22:1 | — | <0.3 | <2 | <0.3 | 0-0.5 | 0-0.3 | 0-0.5 | 0-0.2 |
| C22:2 | — | — | — | — | — | — | — | 0-0.3 |
| 024:0 | — | <0.4 | 0.5-3 | 1.1-2.2 | 0-0.5 | 0-0.1 | 0-0.5 | 0.2-0.3 |
| C24:1 | — | — | — | <0.3 | — | — | <0.5 | — |

Sources: Codex Alimentarius Commission, 1983 and 1993.

More recently, oils from transgenic plants have been created. Some embodiments of the present disclosure may incorporate For the instant disclosure the preferred source of stearidonic acid is transgenic soybeans which have been engineered to produce high levels of stearidonic acid. The soybeans may be processed at an oil processing facility and oil may be extracted consistent with the methods described in US Patent Applications 2006/0111578A1, 2006/0110521A1, and 2006/0111254A1.

Methods of Feeding Poultry:

Accordingly, in embodiments of the present disclosure, the methods comprise increasing the levels of omega-3 fatty acids where stearidonic acid is added to said livestock feed in an amount in excess of 0.2% of the feed, in excess of 0.5% of the feed, in excess of 0.8% of the feed, in excess of 1.5% of the feed. In some embodiments, the concentration of SDA may be added to the livestock feed in amounts as high as 5% or even 10%. The source of added stearidonic acid can be synthetic or natural. The natural stearidonic acid is sourced from a grain or marine oils or from oils from the group consisting of palm oil, sunflower oil, safflower oil, cottonseed oil, canola oil, corn oil, soybean oil, and flax oil. The natural stearidonic acid in the grain or oilseed is genetically modified to an elevated level in such grain or oil as compared to the levels of stearidonic acid found in the native grain or oil.

The SDA may be incorporated in the diet in the form of a whole seed, extracted oil, triglyceride, or ethyl ester. The form of SDA may be incorporated into the diet and fed in as a meal, crumble or pellet. The SDA may be combined with grains (i.e., corn, wheat, barley), oilseed meals (i.e., soybean meal, cottonseed meal, flaxseed meal, canola meal), byproducts (i.e., wheat middlings, wheat bran, rice bran, corn distiller dried grains, brewers grains, corn gluten meal, corn gluten feed, molasses, rice mill byproduct), oils (i.e., corn oil, flax oil, soy oil, palm oil, animal fat, poultry fat, restaurant grease, and blends thereof), vitamin and minerals, amino acids, antioxidants, tocochromanols, tocopherols, coccidostats, etc.

Particularly preferred for use in the poultry feed are antioxidants, which will further improve stability of the fatty acids within the feed. Exemplary antioxidants include tocopherols (Vitamin E), ascorbic acid (Vitamin C), Vitamin C salts (e.g., L-sodium, L-calcium ascorbate), Vitamin C esters (e.g., ascorbyl-5,6-diacetate, ascorbyl-6-palmitate), ethoxyquin, citric acid, calcium citrate, butylated hydroxyl anisole (BHA), butylated hydroxytoluene (BHT), tertiary butyl hydroquinone (THBQ), natural antioxidants (e.g., rosemary extract), and the like, and combinations thereof.

Amounts of antioxidants to be added to the poultry feed will typically depend on the antioxidant to be added, and further, on the other components in the feed. Exemplary amounts of antioxidants to be added include from about 1 ppm to about 200 ppm. More preferably, antioxidants can be added in amounts of from about 10 ppm to about 150 ppm, and even more preferably, from about 10 ppm to about 50 ppm. In one particularly preferred embodiment, the antioxidant is tocopherol and the poultry feed includes 10 ppm tocopherol.

Improved Poultry Products:

Preferred embodiments of the present disclosure comprise methods of increasing the levels of omega-3 fatty acids in the meat and eggs of poultry, where the method comprises adding stearidonic acid to a poultry feed in an amount at least about 0.2% of the feed, 0.5% of the feed, 0.8% of the feed, 1.5% of the feed or more. The concentrations of beneficial fatty acids may include the following, for example: feeding SDA Ethyl Ester: in breast (mg/100 g fatty acids) meat: 500-3000 mg SDA/100 g fatty acids, 200-2000 mg EPA/100 g fatty acids, 500-3000 g DPA/100 g fatty acids and 400-2000 mg DHA/100 g fatty acids; in thigh/leg meat (mg/100 g fatty acids): 500-4000 mg SDA/100 g fatty acids, 50-1000 mg EPA/100 g fatty acids, 150-1200 mg DPA/100 g fatty acids, and 50-400 mg DHA/100 g fatty acids; and in eggs (mg/100 g of egg): 10-25 mg SDA/100 g, 10-25 mg EPA/100 g, 35-60 mg/100 g DPA/100 g and 150-185 mg DHA/100 g as a result of the inclusion of stearidonic acid in the diets. Feeding SDA soybean oil: in breast (mg/100 g fatty acids) meat: 1000-20,000 mg SDA/100 g fatty acids, 200-4000 mg EPA/100 g fatty acids, 500-4000 g DPA/100 g fatty acids and 400-2000 mg DHA/100 g fatty acids; in thigh/leg meat (mg/100 g fatty acids): 500-4000 mg SDA/100 g fatty acids, 200-3000 mg EPA/100 g fatty acids, 500-4000 mg DPA/100 g fatty acids, and 100-1500 mg DHA/100 g fatty acids.

Improved Animal Productivity:

In food production, and specifically producing animal products such as milk, beef, pork, eggs, chicken, fish etc., there is need to improve production efficiency. Production efficiency, that is the production of the maximum quantity of animal products while minimizing the time and cost of production for those products, is important in maintaining a competitive economic advantage. In such an industry a producer (e.g., a farmer or rancher) generally wants to maximize the amount of animal product produced (e.g., gallons of milk, pounds of beef or eggs laid) while keeping the costs associated with feed as low as possible in order to achieve maximum animal productivity. The maximized amount of animal product should be produced at a minimized cost to the producer. Costs to the producer include the cost of feed needed to produce the animal products, as well as the costs of related equipment and housing facilities for the animals. Importantly, to maximize productivity gains relative to costs such gains should preferably be produced in a minimum time period.

Producers are constantly trying to increase these production efficiencies. One way of increasing production efficiencies is by altering the feed which animals are fed. For example, a feed with certain amounts of nutrients can cause an animal to grow or produce animal products quickly and/or perform better in the production of desirable products, whereas a different feed with different amounts of nutrients may cause an animal to grow or produce animal products on a more cost effective basis. (Calder (2002); Klasing (2000); and, Mattos (2000)).

One embodiment of the present disclosure provides a method for improving animal productivity by providing lower cost plant-based omega-3 fatty acids such that it can become a regular part of the diet and will in turn enhance animal reproductive capacity, weight gain and overall productivity. (Calder (2002); Klasing (2000); and, Mattos (2000)).

Illustrative Embodiments of the Disclosure

The following examples are included to demonstrate general embodiments of the disclosure. It should be appreciated by those of skill in the art that the techniques disclosed in the examples which follow represent techniques discovered by the inventors to function well in the practice of the disclosure, and thus can be considered to constitute preferred modes for its practice. However, those of skill in the art should, in light of the present disclosure, appreciate that many changes can be made in the specific embodiments which are disclosed and still obtain a like or similar result without departing from the disclosure.

All of the compositions and methods disclosed and claimed herein can be made and executed without undue experimentation in light of the present disclosure. While the compositions and methods of this disclosure have been described in terms of preferred embodiments, it will be apparent to those of skill in the art that variations may be applied without departing from the concept and scope of the disclosure.

In the examples below, SDA ethyl esters were used in place of traditional oils to isolate the specific fatty acid and allow for different dosages in Examples 1, 2 and 4. In Example 3, transgenic soybean oil containing SDA was used. Similar results would be obtained when feeding oil derived from other transgenic plants such as corn, or canola. Application of ethyl esters of fatty acids is a common practice in the nutritional sciences. See for example Krokhan et al., 1993; Arachchige et al., 2006; Martinez et al., 2000; Lim et al., 2000; and Allen et al., 1998. It was unexpected to see a greater incorporation of SDA in poultry meat when chickens were fed SDA produced from the transgenic soybeans as compared to feeding the SDA ethyl ester.

EXAMPLE 1

Poultry Meat Products—A 21 Day Study (SDA Ethyl Ester)

A 21 day study was conducted to determine whether broiler chickens fed a diet containing SDA could produce meat with elevated levels of omega-3 fatty acids including EPA and DHA.

Fifty pens of four birds per pen were used. There were 25 pens of males and 25 pens of females. Five pens of males and five pens of females were each fed one of five treatment diets from day 21 to 42 days of age. Prior to day 21 all birds were fed a standard 22% protein starter diet formulated to meet NRC (1994) nutrient requirements (shown in Table 16 as "S" diet). The feed prepared was feed as a crumble.

The dietary treatments are shown in Table 3.

TABLE 3

Dietary Treatments for Broilers Fed n-3 Enriched Diets from Day (21-42).

| Treatment | Description |
| --- | --- |
| 1 | Control |
| 2 | 0.16% DHA - Ethyl Esters |
| 3 | 0.33% DHA - Ethyl Esters |
| 4 | 0.42% SDA - Ethyl Esters |
| 5 | 0.83% SDA - Ethyl Esters |

The percentage levels refer to the percentage of the DHA or SDA ethyl esters in the total feed composition on a gram per gram basis.

The DHA and SDA ethyl esters were purchased from KD Pharma Bexbach GmbH, Bexbach, Germany.

The test diets were prepared and fed in mash form. All broilers had ad libitum access to feed and water for the duration of the 21 day study. The composition of the diets (Table 4) and premixes (Table 5) are provided below.

TABLE 4

Composition (% of Diet) of Test Diets for Broilers (Day 21-42)

| | | DHA Ethyl Ester | | SDA Ethyl Ester | |
| --- | --- | --- | --- | --- | --- |
| Ingredient | Control % | 0.163% % | 0.326% % | 0.416% % | 0.832% % |
| Basal Diet - Broiler[1] | 90 | 90 | 90 | 90 | 90 |
| Premix - Control | 10 | | | | |
| Premix - 1.63% DHA EE | | 10 | | | |

TABLE 4-continued

Composition (% of Diet) of Test Diets for Broilers (Day 21-42)

| | | DHA Ethyl Ester | | SDA Ethyl Ester | |
| --- | --- | --- | --- | --- | --- |
| Ingredient | Control % | 0.163% % | 0.326% % | 0.416% % | 0.832% % |
| Premix - 3.26% DHA EE | | | 10 | | |
| Premix - 4.16% SDA EE | | | | 10 | |
| Premix - 8.32% SDA EE | | | | | 10 |
| Total | 100 | 100 | 100 | 100 | 100 |

[1]Corn (61.91%), 48% de-hulled SBM (29.74%), salt (0.44%), Calcium carbonate (1.12%), di-calcium phosphate (1.79%), Trace mineral PMX (0.10%), tallow (4.51%), Choline CL-60 (0.03%), DL-Methionine (0.20%), L-Lysine (0.05%), Vitamin PMX (0.10%), Vitamin/Trace Mineral PMX (0.00%).

TABLE 5

Composition (% of Premix) of Broiler Premixes

| | | DHA Ethyl Ester | | SDA Ethyl Ester | |
| --- | --- | --- | --- | --- | --- |
| Ingredient | Control % | 1.63% % | 3.26% % | 4.16% % | 8.32% % |
| Corn | 87.188 | 87.188 | 87.188 | 87.188 | 87.188 |
| Tallow | 12.500 | 10.694 | 8.878 | 6.551 | 0.614 |
| DHA-Ethyl Esters (90)% | — | 1.806 | 3.622 | — | — |
| SDA-Ethyl Esters (70)% | — | — | — | 5.949 | 11.886 |
| Rendox | 0.312 | 0.312 | 0.312 | 0.312 | 0.312 |
| Total | 100.000 | 100.000 | 100.000 | 100.000 | 100.000 |

To help prevent oxidation of the fatty acids, 0.05% ethoxyquin (Rendox) was added to each premix. Premixes were manufactured within 3 days of arrival of ethyl esters. To limit oxidation associated with storage, diets were manufactured once and stored in a refrigerated cooler at 4° C. during the duration of the study.

The test facility was divided into 10 blocks of five pens each. Sex was randomized to block. Within each block, treatments were assigned to pens using a randomized block design. Birds within sex were randomly allotted to pens. There were four birds per pen with 10 pens per treatment (5 pens of males and 5 pens of females).

Birds were housed in concrete floor pens (~5'×3') of an environmentally controlled facility. All pens contained new litter (pine wood shavings). Lighting was via incandescent lights and a commercial lighting program. Hours of light for every 24 hour period is shown in Table 6.

TABLE 6

Lighting Program

| Approximate Bird Age (days) | Approximate Hours of Light Per 24 hr Period | Approximate Light Intensity (Foot Candles) |
| --- | --- | --- |
| 0-5 | 24 | 1.0-1.3 |
| 5-11 | 10 | 1.0-1.3 |
| 11-19 | 12 | 0.2-0.3 |
| 19-42 | 16 | 0.2-0.3 |

Environmental conditions for the birds (e.g., floor space, bird density, temperature, lighting, feeder and water space) were similar for all treatment groups.

Birds were vaccinated for Mareks and Newcastle-Infectious Bronchitis at the hatchery. No other vaccinations, or treatments (except the test article and coccidiostat) were administered during the study.

The amount of test diet offered was limited to what the birds would consume in approximately one week (but still allowed ad libitum feeding) to allow for storage of the diets at a cooler temperature. Additional feed was weighed into each pen on a weekly basis. All feed added and removed was weighed and recorded.

After day 41 body weights and feed weigh back were conducted, the remaining feed in the feeders was returned to the pens. At approximately 12 hours prior to slaughter, the feeders were removed from the pens. The feed remaining in the feeders was weighed and recorded.

The test facility, pens, and birds were observed at least twice daily for general flock condition, lighting, water, feed, ventilation and unanticipated events.

Any bird that was found dead or was sacrificed was weighed and necropsied. The weight and probable cause of death and necropsy findings were recorded. On day 30 any sex slips noted were removed, weighed and recorded.

Birds were weighed on days 0, 20, and 41. At each body weight period the feed remaining in the pens was weighed and recorded.

The day following the final bird weighing, birds were sacrificed and tissues collected.

For male pens only, four out of the five pens were randomly selected. Two birds from each of these pens were randomly selected (eights birds per treatment). The right and left thigh and right and left breast from these 40 birds were bagged and labeled and frozen. The right breast and thigh samples were analyzed for shelf life stability and the left skinless breast and left boneless, skinless thigh from these same birds were analyzed for fatty acid composition.

The long chain fatty acid composition of the breast meat and thigh meat is presented in Tables 7 and 8, respectively.

TABLE 7

Long Chain Fatty Acid Composition (Fatty Acid TAG equivalent) of Skinless Breast Meat from Chickens fed Control, DHA, and SDA.

| Parameter | Control | DHA Ethyl Ester | | SDA Ethyl Ester | |
|---|---|---|---|---|---|
| | | 0.163% | 0.326% | 0.416% | 0.832% |
| ALA (C18:3n-3), mg/100 g | 12.5 | 10 | 10 | 10 | 10 |
| SDA (C18:4n-3), mg/100 g | ND | ND | ND | 22.5 | 40 |
| EPA (C20:5n-3), mg/100 g | 2.5 | 10 | 10 | 20 | 27.5 |
| DPA (C22:5 n-3), mg/100 g | 7.5 | 10 | 10 | 22.5 | 30 |
| DHA (C22:6n-3), mg/100 g | 10.0 | 55.0 | 80 | 10 | 10 |
| Total omega 3's, mg/100 g | 32.5 | 85.0 | 110 | 85 | 117.5 |
| Omega 6/Omega 3 ratio | 8.6 | 2.9 | 1.9 | 2.9 | 2.0 |

Each value represents mg/100 g tissue, with a mean of 4;
ND = not detected.

TABLE 8

Long Chain Fatty Acid Composition (Fatty Acid TAG Equivalent) of Boneless Skinless Thigh Meat From Chickens fed Control, DHA, and SDA.

| Parameter | Control | DHA Ethyl Ester | | SDA Ethyl Ester | |
|---|---|---|---|---|---|
| | | 0.163% | 0.326% | 0.416% | 0.832% |
| ALA (C18:3n-3), mg/100 g | 65 | 70 | 75 | 82.5 | 86.7 |
| SDA (C18:4n-3), mg/100 g | 10 | 10 | 10 | 187.5 | 386.7 |
| EPA (C20:5n-3), mg/100 g | 10 | 10 | 27.5 | 30 | 50 |
| DPA (C22:5 n-3), mg/100 g | 10 | 15 | 20 | 37.5 | 50 |
| DHA (C22:6n-3), mg/100 g | 10.0 | 67.5 | 125 | 20 | 20 |
| Total omega 3's, mg/100 g | 105 | 172.5 | 257.5 | 362.5 | 593.3 |
| Omega 6/Omega 3 ratio | 10.1 | 8.4 | 5.7 | 4.4 | 2.7 |

Each value represents mg/100 g of tissue a mean of 4;
ND = not detected.

No differences in feed consumption or body weight gain were observed among treatment groups.

Feeding SDA to broilers for the last 21 days prior to slaughter resulted in a significant increase in omega-3 fatty acid enrichment in breast and thigh meat as compared to the control. In breast meat, SDA, EPA, DHA and DPA were enriched in a dose dependent manner. The SDA supplementation results in higher levels of SDA, EPA, DHA and DPA enrichment in breast meat than with the control or DHA supplementation. The increase in total omega-3 fatty acids took about three times the dietary concentration of SDA as it did DHA. SDA supplementation resulted in breast meat with a similar omega-6 to omega-3 ratio as compared to breast meat from birds supplemented with DHA and both were better than the control.

According to the current disclosure and preferred embodiments thereof, SDA supplementation had a greater impact on omega 3 enrichment in thigh meat as compared to breast. Total omega 3 fatty acids in thigh meat of SDA supplemented birds was 4.5 to 5 times that in the breast meat as compared to 2 times for the DHA supplemented birds. A significant portion of this difference is likely the result of additional fat content in the thigh meat samples due to the attached skin. SDA, DHA, and DPA were enriched in thigh meat in a dose dependent manner with SDA supplementation. In the thigh meat, DHA was also double the control levels in the SDA supplemented birds. The omega-6 to omega-3 ratios were twice as good for the SDA supplemented group as compared to the DHA group. Based on this data, SDA was almost equal to DHA on a dietary concentration basis in providing the same levels of total omega-3 fatty acids in thigh meat.

No difference was observed between the oxidative rancidity as measured by the TBA assay for the breast and thigh meat samples of birds fed SDA as compared to the controls. The oxidative rancidity of the meat from the SDA fed birds was lower than the oxidative rancidity values of the birds fed the DHA treatments.

EXAMPLE 2

Poultry Meat Products—A 42 Day Study (SDA Ethyl Ester)

A 42 day study was conducted to determine whether broiler chickens fed a diet containing SDA could produce meat with elevated levels of omega-3 fatty acids as compared to chickens fed diets containing DHA and fish oil.

Fifty six pens of 25 male birds (Ross×Ross 308) per pen were used. Day old birds were obtained and immediately placed in floor pens containing (used) pine wood shavings, hanging tube feeders and nipple-waterers or plassons. Eight pens were each fed one of seven treatments for 42 days. The experiment was divided into four growth phases (0-7 days, 7-21 days, 21-35 days, and 35-42 days). The experimental diets were crumbled for the first two phases (0-21 days) and pelleted thereafter.

The dietary treatments are shown in Table 9.

TABLE 9

Dietary Treatments for Broilers Fed n-3 Enriched Diets from Day (0 42).

| Treatment | Description |
|---|---|
| 1 | Control (5% Poultry Fat) |
| 2 | Control 2 (1% Poultry Fat, 4% Corn Oil) |
| 3 | 0.27% SDA (0.36% SDA Ethyl Esters) + 4.64% Poultry Fat |
| 4 | 0.54% SDA (0.71% SDA Ethyl Esters) + 4.29% Poultry fat |
| 5 | 0.80% SDA (1.07% SDA Ethyl Esters) + 3.93% Poultry Fat |
| 6 | 0.27% DHA (0.30% DHA Ethyl Esters) + 4.70% Poultry Fat |
| 7 | 3% Fish Oil + 1% Poultry Fat + 1% Corn Oil |

The percentage levels refer to the percentage of the DHA or SDA in the feed.

The DHA ethyl ester (90% DHA) and SDA ethyl esters (75% SDA for phases 1-2 and 65% SDA for phases 3-4) were purchased from KD Pharma Bexbach GmbH, Bexbach, Germany.

All broilers had ad libitum access to feed and water for the duration of the 42 day study.

Diets consisted of 93% base mix (Table 10) plus 7% Test Oil Mix (Table 11). The diets supplied 3008, 3083, 3183 and 3208 kcal/kg of metabolizable energy for the pre-starter, starter, grower and finisher phases, respectively.

TABLE 10

Composition (% of diet) of the Base Mix for Broilers (Day 0-42)

|  | Prestarter (d 0-7) | Starter (d 8-21) | Grower (d 22-35) | Finisher (d 36-42) |
|---|---|---|---|---|
| SDA, Corn - Fine Ground | 47.631 | 52.777 | 60.570 | 63.482 |
| SDA, Soybean Meal - 48% Protein | 38.346 | 31.940 | 25.068 | 22.310 |
| Meat and Bone Meal - Pork | 4.000 | 6.050 | 5.000 | 5.000 |
| SALT | 0.430 | 0.387 | 0.378 | 0.405 |
| CALCIUM CARBONATE | 0.886 | 0.573 | 0.795 | 0.849 |
| Phosphate - Mono Dicalcium | 1.012 | 0.488 | 0.562 | 0.461 |
| CHOLINE CHLORIDE-60 | 0.088 | 0.071 | 0.047 | 0.021 |
| DL METHIONINE - DRY | 0.242 | 0.249 | 0.241 | 0.183 |
| L-LYSINE HCL | 0.019 | 0.095 | 0.118 | 0.079 |
| THREONINE | 0.016 | 0.040 | 0.061 | 0.050 |
| Ethoxyquin | 0.015 | 0.015 | 0.015 | 0.015 |
| Turkey Vitamin Premix | 0.120 | 0.120 | 0.100 | 0.100 |
| Poultry Trace Mineral Premix | 0.060 | 0.060 | 0.060 | 0.060 |
| [VOLUME] % | 93.000 | 93.000 | 93.000 | 93.000 |
| Metabolizable energy KCAL/KG | 2558.000 | 2633.000 | 2733.000 | 2758.000 |
| PROTEIN % | 23.625 | 22.361 | 19.455 | 18.279 |
| DIG LYSINE % | 1.200 | 1.150 | 1.000 | 0.900 |
| DIG METHIONINE % | 0.573 | 0.563 | 0.523 | 0.453 |
| FAT % | 2.461 | 2.736 | 2.881 | 2.947 |

Ethoxyquin was added to reduce oxidation of the fatty acids.

TABLE 11

Composition (% of diet) of the Test Oil Mix

|  | 1 | 2 | 3 | 4 | 5 | 6 | 7 |
|---|---|---|---|---|---|---|---|
| Pre-starter and Starter Phase (d 0-21) | | | | | | | |
| Poultry Fat | 5.000 | 1.000 | 1.000 | 1.000 | 1.000 | 1.000 | 1.000 |
| Corn Oil |  | 4.000 | 3.643 | 3.287 | 2.930 | 3.703 | 1.000 |
| Fish Oil |  |  |  |  |  |  | 3.000 |
| SDA (75EE) |  |  | 0.357 | 0.713 | 1.070 |  |  |
| DHA (90EE) |  |  |  |  |  | 0.297 |  |
| Corn Starch | 1.995 | 0.565 | 0.665 | 0.766 | 0.866 | 0.648 | 1.410 |
| Sand | 0.005 | 1.435 | 1.335 | 1.234 | 1.134 | 1.352 | 0.590 |
| Total Fat | 5.00 | 5.00 | 5.00 | 5.00 | 5.00 | 5.00 | 5.00 |
| Kcal from fat source | 450 | 450 | 450 | 450 | 450 | 450 | 450 |
| Grower and Finisher Phase (d 22-42) | | | | | | | |
| Poultry Fat | 5.000 | 1.000 | 1.000 | 1.000 | 1.000 | 1.000 | 1.000 |
| Corn Oil |  | 4.000 | 3.588 | 3.177 | 2.765 | 3.703 | 1.000 |
| Fish Oil |  |  |  |  |  |  | 3.000 |
| SDA (65EE) |  |  | 0.412 | 0.823 | 1.235 |  |  |
| DHA (90EE) |  |  |  |  |  | 0.297 |  |
| Corn Starch | 1.562 | 0.478 | 0.563 | 0.647 | 0.732 | 0.539 | 1.095 |
| Sand | 0.438 | 1.522 | 1.437 | 1.353 | 1.268 | 1.461 | 0.905 |

TABLE 11-continued

| Composition (% of diet) of the Test Oil Mix | | | | | | | |
|---|---|---|---|---|---|---|---|
| | 1 | 2 | 3 | 4 | 5 | 6 | 7 |
| Total Fat | 5.00 | 5.00 | 5.00 | 5.00 | 5.00 | 5.00 | 5.00 |
| Kcal from fat source | 450 | 450 | 450 | 450 | 450 | 450 | 450 |

A randomized block design was used. Treatments were randomly assigned to pens such that each of the seven treatments was replicated 8 times (8 pens with each pen containing 25 birds).

Chicks were weighed (by pen) at experiment initiation, and chick and feed weights were measured when diets were switched (7, 21, and 35 days respectively) and at experiment termination (42 days of age).

On day 42, following a 10-hour period of feed withdrawal, 8 birds per pen (64 birds/treatment; 7 treatments; 448 birds total) were randomly selected and processed using commercial processing procedures. Carcasses were cut-up and de-boned at 4 hours postmortem. Carcass and parts yields were calculated and meat samples (breast and thigh) were collected for meat quality, fatty acid analysis, and sensory evaluation.

According to the methodology of the disclosure the data was generated and analyzed as a completely randomized trial design.

Body weights of the birds were fairly similar with and without SDA inclusion.

There were minor variations in carcass yield, but the commercial implications of SDA on carcass or parts yield was negligible. Likewise, there were minor variations in meat quality traits (e.g., visual and Minolta color, drip loss, cook loss), but the commercial implications of SDA on meat quality were negligible.

According to the current disclosure sensory evaluations were conducted by an expert test panel trained to detect fishy off-flavors. None were detected by the panel and thus the data was not included in the tables. Overall, it appears that the test oil supplementation with the SDA composition of the disclosure can, over time, affect some measures of the sensory experience. However, these differences would not be commercially substantial nor detectable to an untrained palate.

Long chain fatty acid composition of the breast meat and thighs are presented in Tables 12A, 12B and 13A and 13B respectively.

TABLE 12A

Fatty Acid Composition of Breast Meat (% of fatty acids)

| | Omega 6 and Omega 3 Fatty Acids | | | | | | | |
|---|---|---|---|---|---|---|---|---|
| Dietary Treatment | Total C18:3 | SDA C18:4n-3 | C20:4n-3 | EPA C20:5n-3 | C22:4n-6 | DPA C22:5n-3 | DHA C22:6n-3 | ARA C20:4n-6 |
| Poultry Fat | 0.76 | 0.41 | ND[1] | 0.16 | 0.72 | 0.47 | 0.42 | 3.00 |
| Corn oil + Poultry Fat | 0.65 | 0.62 | ND | 0.18 | 1.02 | 0.40 | 0.37 | 3.71 |
| 0.27% SDA | 0.89 | 0.71 | 0.15 | 0.44 | 0.59 | 1.01 | 0.56 | 2.81 |
| 0.54% SDA | 0.97 | 1.23 | 0.22 | 0.68 | 0.46 | 1.35 | 0.64 | 2.63 |
| 0.80% SDA | 0.95 | 1.56 | 0.34 | 0.81 | 0.32 | 1.60 | 0.81 | 2.54 |
| 0.27% DHA | 0.66 | 0.59 | ND | 0.16 | 0.53 | 0.48 | 2.78 | 3.01 |
| 3% Fish oil | 0.87 | 0.41 | 0.17 | 1.37 | 0.23 | 1.37 | 3.48 | 1.97 |
| Statistics | | | | | | | | |
| Linear SDA | 0.040 | 0.000 | | 0.000 | 0.000 | 0.000 | 0.009 | 0.000 |
| Quadratic SDA | 0.067 | 0.232 | | 0.052 | 0.004 | 0.000 | 0.747 | 0.011 |
| Cubic SDA | 0.589 | 0.108 | | 0.799 | 0.361 | 0.024 | 0.422 | 0.973 |
| DHA vs Control | 0.879 | 0.664 | | 0.827 | 0.000 | 0.208 | 0.000 | 0.000 |
| DHA vs 0.80% SDA | 0.029 | 0.000 | | 0.000 | 0.006 | 0.000 | 0.000 | 0.011 |

[1]ND = Not Detectable

TABLE 12B

Fatty Acid Composition of Breast Meat (% of fatty acids)

| Dietary Treatment | C16:0 | C16:1 | C18:0 | C18:1 | C18:2 |
|---|---|---|---|---|---|
| Poultry Fat | 22.35 | 4.49 | 8.63 | 37.07 | 15.84 |
| Corn oil + Poultry Fat | 22.07 | 3.55 | 8.58 | 31.07 | 23.07 |
| 0.27% SDA | 21.08 | 3.27 | 8.12 | 31.05 | 23.66 |
| 0.54% SDA | 21.82 | 3.33 | 8.64 | 31.34 | 23.18 |
| 0.80% SDA | 22.69 | 3.58 | 9.03 | 31.66 | 19.56 |
| 0.27% DHA | 21.82 | 3.09 | 8.76 | 30.41 | 22.94 |
| 3% Fish oil | 22.91 | 4.09 | 9.13 | 32.50 | 17.24 |
| Statistics | | | | | |
| Linear SDA | 0.940 | 0.896 | 0.590 | 0.927 | 0.052 |
| Quadratic SDA | 0.983 | 0.695 | 0.853 | 0.659 | 0.041 |
| Cubic SDA | 0.624 | 0.678 | 0.724 | 0.572 | 0.627 |
| DHA vs Control | 0.643 | 0.258 | 0.877 | 0.677 | 0.689 |
| DHA vs 0.80% SDA | 0.497 | 0.258 | 0.452 | 0.613 | 0.205 |

TABLE 13A

Fatty Acid Composition of Thigh Meat and Attached Skin
(% of fatty acids)

| | Omega 6 and Omega 3 Fatty Acids | | | | | | | |
|---|---|---|---|---|---|---|---|---|
| Dietary Treatment | Total C18:3 | SDA C18:4n-3 | C20:4n-3 | EPA C20:5n-3 | C22:4n-6 | DPA C22:5n-3 | DHA C22:6n-3 | ARA C20:4n-6 |
| Poultry Fat | 1.16 | 0.10 | 0.03 | 0.05 | 0.24 | 0.13 | 0.08 | 1.01 |
| Corn oil + Poultry Fat | 1.11 | 0.27 | 0.03 | 0.04 | 0.29 | 0.11 | 0.09 | 1.11 |
| 0.27% SDA | 1.17 | 0.96 | 0.13 | 0.19 | 0.22 | 0.36 | 0.18 | 1.08 |
| 0.54% SDA | 1.21 | 1.73 | 0.19 | 0.27 | 0.16 | 0.44 | 0.20 | 0.94 |
| 0.80% SDA | 1.40 | 2.43 | 0.25 | 0.41 | 0.12 | 0.60 | 0.22 | 0.86 |
| 0.27% DHA | 1.03 | 0.24 | 0.03 | 0.11 | 0.16 | 0.14 | 0.73 | 0.81 |
| 3% Fish oil | 1.26 | 0.30 | 0.18 | 0.93 | 0.10 | 0.63 | 1.41 | 0.71 |
| Linear SDA | 0.811 | 0.000 | 0.000 | 0.000 | 0.000 | 0.000 | 0.033 | 0.000 |
| Quadratic SDA | 0.292 | 0.777 | 0.118 | 0.623 | 0.000 | 0.020 | 0.208 | 0.390 |
| Cubic SDA | 0.521 | 0.770 | 0.342 | 0.085 | 0.910 | 0.000 | 0.490 | 0.121 |
| DHA vs Control | 0.584 | 0.740 | 0.689 | 0.007 | 0.000 | 0.271 | 0.000 | 0.000 |
| DHA vs 0.80% SDA | 0.667 | 0.000 | 0.000 | 0.000 | 0.000 | 0.000 | 0.000 | 0.005 |

[1]ND = Not Detectable

TABLE 13B

Chain Fatty Acid Composition of Thigh Meat and Attached Skin
(% of fatty acids)

| | C16:0 | C16:1 | C18:0 | C18:1 | C18:2 |
|---|---|---|---|---|---|
| Dietary Treatment | | | | | |
| Poultry Fat | 22.87 | 5.85 | 7.40 | 41.45 | 17.35 |
| Corn oil + Poultry Fat | 21.44 | 4.46 | 6.24 | 35.96 | 26.01 |
| 0.27% SDA | 21.28 | 4.42 | 6.35 | 35.26 | 25.64 |
| 0.54% SDA | 24.34 | 4.87 | 7.46 | 36.20 | 24.56 |
| 0.80% SDA | 21.90 | 4.95 | 7.35 | 34.11 | 24.22 |
| 0.27% DHA | 21.71 | 4.48 | 6.31 | 35.94 | 25.99 |
| 3% Fish oil | 22.31 | 5.95 | 6.48 | 36.82 | 18.91 |
| Statistics | | | | | |
| Linear SDA | 0.063 | 0.236 | 0.589 | 0.006 | 0.003 |
| Quadratic SDA | 0.962 | 0.448 | 0.697 | 0.630 | 0.482 |
| Cubic SDA | 0.434 | 0.877 | 0.608 | 0.989 | 0.625 |
| DHA vs Control | 0.780 | 0.866 | 0.820 | 0.895 | 0.910 |
| DHA vs 0.80% SDA | 0.028 | 0.182 | 0.369 | 0.007 | 0.007 |

More fatty acids accumulated in the thigh meat than in the breast meat. In both tissues, a linear increase (P>0.001) in SDA, EPA, DPA, and DHA accumulation was present with increasing SDA content in the feed. In both tissues, a linear decrease (P>0.001) in ARA accumulation was present with increasing SDA content in the feed.

The study was designed such that the highest level of SDA supplementation should give equivalent levels of EPA/DHA accumulation in the tissue assuming a conversion rate of 30%. In both tissues, the highest level of SDA supplementation (0.80%) resulted in equivalent levels of the combination of EPA, DPA and DHA as compared to the 0.27% DHA treatment. The accumulation of SDA in breast meat was 50% of the total EPA, DPA and DHA levels and whereas in the thigh meat it was twice as much as the total EPA, DPA and DHA concentrations. Total SDA, EPA, DPA and DHA concentrations in breast meat (% of fatty acids) for the 0.27% DHA treatment was 4.00% as compared to 2.7%, 3.9% and 4.8% of the 0.27%, 0.54% and 0.80% SDA treatments, respectively. Total SDA, EPA, DPA and DHA concentrations in thigh meat for the 0.27% DHA treatment was 1.2% as compared to 1.7%, 2.6% and 3.7% of the 0.27%, 0.54% and 0.80% SDA treatments, respectively. This suggests that the conversion efficiency of SDA to EPA, DPA and DHA was more efficient in the breast tissue than in the thigh meat. There was a significant reduction of C18:2 in the breast meat with SDA supplementation. In the thigh meat, which contains a much higher content of fat than the breast meat, a significant reduction in C16:0, C18:1, and C18:2 was noted with SDA supplementation. This was an unexpected result since it was not seen with DHA supplementation.

The data above indicate that no negative commercial effects were noted with SDA supplementation on growth performance, carcass yield, meat quality, or sensory characteristics of the meat tissue. Moreover, the resulting fatty acid profiles are expected to have significant health benefits when incorporated into poultry products for consumption in a human diet.

EXAMPLE 3

Poultry Meat Products—A 50 Day Study (SDA Soybean Oil)

The Effect of Feeding Diets Containing Stearidonic Acid Modified Soybean Oil on n-3 Fatty Acid Deposition in Broilers.

The purpose of this study was to determine the extent to which omega-3 fatty acids were enriched in chicken meat when birds were fed diets containing either stearidonic acid (SDA) modified soybean oil, conventional soybean oil or fish oil.

The soybean oils were refined, bleached and deodorized and stabilized with 120 mg/kg TBHQ and 60 mg/kg citric acid. The fatty acid composition of the oils is shown in Table 14.

TABLE 14

Fatty acid composition of oils.

| | Concentration (%) of fatty acid in oil: | | |
|---|---|---|---|
| Fatty acid | SDA Soy Oil | CON Soy oil | FISH Oil |
| C16:0 | 8.38 | 7.28 | 8.50 |
| C16:1 | 0.05 | 0.06 | 3.73 |
| C18:0 | 2.95 | 3.05 | 1.84 |

TABLE 14-continued

Fatty acid composition of oils.

| Fatty acid | Concentration (%) of fatty acid in oil: | | |
|---|---|---|---|
| | SDA Soy Oil | CON Soy oil | FISH Oil |
| C18:1 cis 9 | 8.82 | 13.00 | 10.30 |
| C18:1 trans 11 | 9.90 | 1.01 | 1.94 |
| C18:2 n-6 | 12.40 | 34.00 | 3.97 |

TABLE 14-continued

Fatty acid composition of oils.

| Fatty acid | Concentration (%) of fatty acid in oil: | | |
|---|---|---|---|
| | SDA Soy Oil | CON Soy oil | FISH Oil |
| C18:3 n-6 | 5.36 | 0.00 | 0.00 |
| C18:3 n-3 | 6.95 | 4.99 | 1.18 |
| C18:4 n-3 | 24.10 | 0.00 | 1.43 |
| C20:1 | 0.06 | 0.07 | 2.22 |
| C20:4 n-6 | 0.06 | 0.00 | 0.43 |
| C20:3 | 0.00 | 0.00 | 0.10 |
| C22:1 | 0.00 | 0.00 | 4.20 |
| C20:5 n-3 | 0.00 | 0.00 | 6.59 |
| C22:4 | 0.00 | 0.00 | 0.7 |
| C22:5 n-3 | 0.00 | 0.00 | 2.66 |
| C22:6 n-3 | 0.00 | 0.00 | 7.14 |

Twenty four pens of 5 male birds (Ross 308) per pen were used. In the starter phase, birds were housed in a single pen and fed a common diet. Birds were assigned randomly to treatments on day 15 when they were moved on to the grower phase. Birds were weighed and randomly allocated to one of 24 pens (with a solid floor), with five birds per pen and 8 pens per treatment. Pens were blocked in groups of three in the house, and within each block, pens were randomly allocated to one of the three treatments. From days 15-28, birds were fed their respective grower diet (GSDA, GCON or GFISH). From days 29-51, they were fed their respective finisher diet (FSDA, FCON or FFISH).

The seven diets were:
Diet S: Starter diet, containing CON
Diet GSDA: Grower diet, containing SDA
Diet GCON: Grower diet, containing CON
Diet GFISH: Grower diet, containing FISH
Diet FSDA: Finisher diet, containing SDA
Diet FCON: Finisher diet, containing CON
Diet FFISH: Finisher diet, containing FISH The starter diet was prepared as a mash and the grower and finisher diets were pelleted using a 4 mm die. The pelleting temperature was kept between 50 and 60° C. Table 16 contains the ingredient formulation of the diets.

SDA soybean oil, control soybean oil and fish oil were added at the inclusion level of 4.5% in the grower diets and 5.0% in the finisher diets.

TABLE 16

Ingredient composition of the diets.

| Feed | Inclusion rate of feedstuff (% of diet as fed) | | | | | | |
|---|---|---|---|---|---|---|---|
| | S | GSDA | GCON | GFISH | FSDA | FCON | FFISH |
| Wheat | 47.5 | 50.2 | 50.2 | 50.2 | 56.9 | 56.9 | 56.9 |
| Soyabean meal | 32.5 | 30.0 | 30.0 | 30.0 | 24.7 | 24.7 | 24.7 |
| Sunflower seed meal | 2.6 | 0.4 | 0.4 | 0.4 | 2.0 | 2.0 | 2.0 |
| Maize gluten meal | 4.0 | 6.5 | 6.5 | 6.5 | 3.0 | 3.0 | 3.0 |
| CaCO$_3$ | 1.5 | 1.2 | 1.2 | 1.2 | 0.6 | 0.6 | 0.6 |
| Dicalcium phosphate | 2.0 | 1.2 | 1.2 | 1.2 | 2.0 | 2.0 | 2.0 |
| SDA oil | 0.0 | 4.5 | 0.0 | 0.0 | 5.0 | 0.0 | 0.0 |
| CON oil | 4.0 | 0.0 | 4.5 | 0.0 | 0.0 | 5.0 | 0.0 |
| FISH oil | 0.0 | 0.0 | 0.0 | 4.5 | 0.0 | 0.0 | 5.0 |
| Salt | 0.4 | 0.25 | 0.25 | 0.25 | 0.25 | 0.25 | 0.25 |
| Vitamin/mineral supplement | 5.0 | 5.0 | 5.0 | 5.0 | 5.0 | 5.0 | 5.0 |
| DL Methionine | 0.2 | 0.2 | 0.2 | 0.2 | 0.2 | 0.2 | 0.2 |
| Lysine | 0.3 | 0.4 | 0.4 | 0.4 | 0.2 | 0.2 | 0.2 |
| Sodium bicarbonate | 0.15 | 0.15 | 0.15 | 0.15 | 0.15 | 0.15 | 0.15 |

Table 17 contains the composition of the vitamin/mineral supplement.

TABLE 17

Composition of the vitamin/mineral supplement.

| Ingredient | Inclusion in premix (g/kg fresh weight) | | |
|---|---|---|---|
| | Starter | Grower | Finisher |
| Wheat | 908.4 | 915.7 | 921.5 |
| Choline chloride 50% | 76.0 | 69.4 | 64.7 |
| Manganese oxide 62% | 3.9 | 3.9 | 3.9 |
| DL-α-tocopherol acetate 50% | 3.0 | 2.0 | 2.0 |
| Zinc oxide 72% | 2.8 | 2.8 | 2.8 |
| Copper sulphate 25% | 1.3 | 1.3 | 1.3 |
| Nicotinic acid 99% | 1.1 | 1.1 | 0.7 |
| Ferrous sulphate monohydrate 30% | 1.1 | 1.5 | 1.1 |
| Selenium 1% | 0.6 | 0.6 | 0.6 |
| Cyanocobalamine 0.1% | 0.3 | 0.3 | 0.2 |
| 97.5% calcium D-pantothenate | 0.3 | 0.3 | 0.3 |
| Vitamin A (retinol) 1 000 000 iu/g (0.01%) | 0.2 | 0.2 | 0.2 |
| Biotin 2% | 0.2 | 0.2 | 0.1 |
| Vitamin B$_2$ riboflavin (80%) | 0.2 | 0.2 | 0.1 |
| Vitamin D$_3$ cholecalciferol 500 000 iu/g | 0.2 | 0.2 | 0.2 |
| Menedione sodium bisulphite 51.5% | 0.1 | 0.1 | 0.1 |
| Pyridoxine hydrochloride 99% | 0.1 | 0.1 | 0.1 |
| Thiamine hydrochloride 99% | 0.1 | 0.04 | 0.04 |
| Folic acid 95% | 0.05 | 0.03 | 0.03 |
| Potassium iodate (59% I) | 0.05 | 0.03 | 0.03 |

Table 18 shows the chemical and fatty acid composition of the diets. Based on the SDA concentration in the oil (24%), the grower diet was formulated to contain 1.08% and the finisher diet 1.2% SDA. The fish oil diets contributed about 0.07% SDA.

TABLE 18

Chemical and fatty acid composition of the diets

| | Diet | | | | | | |
|---|---|---|---|---|---|---|---|
| | S | GSDA | GCON | GFISH | FSDA | FCON | FFISH |
| Chemical composition (g/kg fresh weight) | | | | | | | |
| Dry matter | 898 | 879 | 893 | 939 | 897 | 900 | 896 |
| Crude protein | 261 | 252 | 278 | 294 | 233 | 237 | 220 |
| Oil (Method B)[1] | 66.1 | 75.7 | 81.3 | 80.7 | 75.4 | 75.5 | 77.3 |
| Ash | 58.3 | 48.9 | 50.7 | 50.9 | 53.2 | 55.0 | 51.9 |
| Total sugars | 40.5 | 51.3 | 42.6 | 51.2 | 44.1 | 48.2 | 43.2 |
| Starch | 322 | 318 | 339 | 347 | 377 | 398 | 372 |
| AME (MJ/kg) | 12.2 | 12.5 | 13.3 | 13.8 | 13.1 | 13.5 | 12.8 |
| Fatty acid composition (mg/100 g feed, fresh weight) | | | | | | | |
| C16:0 | 547 | 515 | 478 | 686 | 551 | 578 | 572 |
| C16:1 | 5 | 4 | 4 | 202 | 3 | 5 | 184 |
| C18:0 | 164 | 152 | 159 | 122 | 147 | 182 | 100 |
| C18:1 cis 9 | 813 | 583 | 742 | 746 | 583 | 914 | 633 |
| C18:1 trans 11 | 58 | 53 | 53 | 114 | 53 | 66 | 89 |
| C18:2 n-6 | 2164 | 1194 | 2124 | 975 | 1108 | 2411 | 697 |
| C18:3 n-6 | 2 | 224 | 8 | 4 | 207 | 1 | 2 |
| C18:3 n-3 | 312 | 381 | 291 | 156 | 389 | 347 | 122 |
| C18:4 n-3 | 0 | 968 | 0 | 68 | 1018 | 0 | 63 |
| C20:1 | 0 | 4 | 2 | 80 | 0 | 0 | 77 |
| C20:4 n-6 | 0 | 2 | 6 | 17 | 0 | 0 | 8 |
| C20:3 | 0 | 4 | 0 | 3 | 0 | 0 | 2 |
| C22:1 | 0 | 0 | 0 | 129 | 0 | 0 | 156 |
| C20:5 n-3 | 0 | 0 | 0 | 291 | 0 | 0 | 278 |
| C22:4 | 0 | 0 | 0 | 0 | 0 | 0 | 1 |
| C22:5 n-3 | 0 | 1 | 0 | 91 | 0 | 0 | 105 |
| C22:6 n-3 | 0 | 0 | 0 | 253 | 0 | 0 | 289 |

[1]Method B is acid hydrolysed ether extract.

On day 15, the birds were randomly assigned to one of 24 floor pens (eight pens per treatment). Birds were randomly taken and weighed, and then placed in the pen to which they had been assigned from a computer (Microsoft Excel) random numbers generator. The pens were blocked in three around the house. The pens had a solid floor, with a bedding of wood shavings. From days 15-50, birds were housed within an environmentally controlled facility in pens (~1 $m^2$) providing ~0.2 $m^2$ per bird (excluding feeder and water space). Lighting was provided by fluorescent lights with 23 h continuous light per 24 h period. Environmental conditions of floor space, temperature, lighting, bird density, feeder and water space were similar for all treatment groups.

Birds were vaccinated for infectious bronchitis at the hatchery. No other vaccinations were administered during the study.

Water was provided ad libitum via automatic drinkers throughout the study.

Feed was provided ad libitum throughout the study via hoppers (Super Feeder Hopper 3 kg, 07400, Stockshop, Exeter, UK). For the first few days after arrival from the hatchery, feed was dispensed in egg boxes, until the birds were able to feed from hoppers. Birds were placed on their respective treatment diets on day 15. They were fed a common starter diet from day 1-14, a grower diet from days 15-28 and a finisher diet from days 29-50. Feed added and removed from pens was weighed and recorded. Diet changes were conducted at the same time for all pens.

Birds were weighed individually at 15 d of age (when allocated to pens), and at 41 d. The amount of feed consumed per pen from 15-41 d was calculated by subtracting the feed weighed out of the pen from the total amount of feed weighed into the pen.

Performance data were calculated and summarized by average weight gain per bird at 41 d of age. The average feed:gain was calculated for days 15-41 of age by dividing the total feed consumption by the total weight gain of surviving birds for that pen. Adjusted feed:gain was calculated by dividing the total feed consumption by the weight gain of surviving birds plus the weight gain of birds that died. In the case of the bird that died and was not weighed, the data from this pen (pen 6) was treated as a missing value.

Birds in blocks 1 and 2 were slaughtered on day 41; birds in blocks 3 and 4 on day 43; birds in blocks 5 and 6 on day 48 and birds in blocks 7 and 8 on day 50. When the birds were slaughtered, they were first weighed individually, and then humanely killed. A laminated label was tied to their leg, the birds were plucked, eviscerated and their head removed. The birds were then weighed again before being hung in a cold storage overnight. The following day, the carcass was weighed again. The skin from the breast was removed and weighed. The breast meat was then removed and weighed. The legs were removed from the carcass and weighed. The skin from the legs was then removed and weighed, and the leg meat was then removed and weighed.

Samples of meat and skin for fatty acid analysis were composited by pen. Samples of skinless meat for sensory analysis were composited by treatment. Skin (taken from the leg) and skinless breast and leg meat was taken from all the birds in each pen (total sample size ca 300 g, one composited sample of each tissue type per pen).

The samples were homogenised using a hand held blender (Braun MR4000 Solo Hand Blender). The skin samples were first minced through a Spong mincer before being homogenised using the blender. These samples were then vacuum packed in polythene bags and kept for fatty acid analysis. A second sample of leg skin and skinless breast and leg meat was taken in the same way but was not homogenised. These samples were vacuum packed in polythene bags and kept as retainer samples.

Two composited (by pen) samples of breast skin were retained in polythene bags. These bags were all labeled with study number, pen number and tissue type, and the samples were stored at ~−20° C. The remaining skinless breast and leg meat was vacuum packed in polythene bags labeled with study number, pen number and tissue type. These were also stored at ~−20° C. until used for sensory analysis.

Samples of breast and leg meat were submitted for sensory analysis. Breast meat was assessed when freshly cooked; leg meat was assessed when freshly cooked and when it had been cooked, refrigerated and then reheated (i.e., cooked twice). This was because the higher lipid content of the leg meat was likely to make it more prone to oxidative deterioration, and reheating the meat would provide a greater oxidative stress so as to increase the likelihood of detecting any differences in the oxidative stability of the meats.

A panel of trained assessors (10) participated in discussion and training sessions to identify and define key descriptive attributes that discriminated well between the products. In subsequent rating sessions the panel used 100 point unstructured line scales, with verbal anchors to rate the perceived intensity of each attribute. Each panelist assessed three replicates of each sample over a period of six days. Plain crackers and mineral water were used as palate cleansers between samples. Samples were tasted and chewed, and then spat out rather than being swallowed. The aftertaste of samples was determined one minute after the samples had been removed from the mouth.

The sensory attributes and definitions produced for the breast meat were:

| Appearance | |
| --- | --- |
| Depth of Colour | The degree of browning on the surface of the meat. |
| Texture | The degree of textural undulation perceived visually. |
| Moistness | The degree of moisture or oil seen on the surface of the meat. |
| Aroma | |
| Chicken | The intensity of characteristic chicken aroma perceived. |
| Degree of Roast | The intensity of roast chicken aroma. |
| Meaty | The intensity of a basic meat note found in some chicken, pork or lamb, described as earthy. |
| Veg Oil | The intensity of characteristic vegetable oil aroma perceived. |
| Texture | |
| Hardness | Degree of hardness perceived by biting through the sample with the front teeth. |
| Fibrousnesses | Degree that the fibrous structure is perceived during mastication. |
| Moistness | Degree of moistness perceived during mastication. |
| Cohesiveness | Degree that the sample holds together during mastication. |
| Oily Mouthfeel | Degree of oily coating in the mouth perceived during mastication. |
| Flavour | |
| Chicken | The intensity of characteristic chicken flavour perceived. |
| Degree of Roast | The intensity of the roast flavour perceived. |
| Saltiness | The intensity of characteristic chicken flavour perceived. |
| Sweetness | The intensity of sweetness perceived. |
| Meaty | The intensity of a basic meat note found in some chicken, pork or lamb, described as earthy. |
| Oily Flavour | The intensity of characteristic chicken fat/oil flavour perceived. |
| Aftertaste | 1 minute after removing chicken from mouth. |
| Chicken | The intensity of characteristic chicken flavour perceived. |
| Degree of Roast | The intensity of the roast flavour perceived. |
| Saltiness | The intensity of characteristic chicken flavour perceived. |
| Sweetness | The intensity of sweetness perceived. |
| Meaty | The intensity of a basic meat note found in some chicken, pork or lamb, described as earthy. |

The sensory attributes and definitions for the leg meat were similar to those produced for the breast meat, although some additional descriptors were used. This included a 'fishy' descriptor for aroma, flavour and aftertaste. This was not included in the analysis of breast meat samples as no fishy attributes were detected when the sensory vocabulary was being developed. The leg meat attributes were defined as:

| Appearance | |
| --- | --- |
| Depth of Colour | The degree of browning on the surface of the meat. |
| Texture | The degree of textural undulation perceived visually. |
| Moistness | The degree of moisture or oil seen on the surface of the meat. |
| Aroma | |
| Chicken | The intensity of characteristic chicken aroma perceived. |
| Degree of Roast | The intensity of roast chicken aroma. |
| Meaty | The intensity of a basic meat note found in some chicken, pork or lamb, described as earthy, dirty. |
| Oil | The intensity of characteristic processed food oil aroma perceived. |
| Fish | The intensity of characteristic oily fish aroma perceived. |
| Texture | |
| Hardness | Degree of hardness perceived by biting through the sample with the front teeth. |
| Fibrousnesses | Degree that the fibrous structure is perceived during mastication. |
| Moistness | Degree of moistness perceived during mastication. |
| Cohesiveness | Degree that the sample holds together during mastication. |
| Oily Mouthfeel | Degree of oily coating perceived in the mouth. |
| Flavour | |
| Chicken | The intensity of characteristic chicken flavour perceived. |
| Degree of Roast | The intensity of the roast flavour perceived. |
| Saltiness | The intensity of characteristic chicken flavour perceived. |
| Sweetness | The intensity of sweetness perceived. |
| Meaty | The intensity of a basic meat note found in some chicken, pork or lamb, described as earthy. |
| Fishy | The intensity of characteristic oily fish flavour perceived. |
| Oily Flavour | The intensity of characteristic chicken fat/oil flavour perceived. |
| Aftertaste | 1 minute after removing chicken from mouth. |
| Chicken | The intensity of characteristic chicken flavour perceived. |
| Degree of Roast | The intensity of the roast flavour perceived. |
| Saltiness | The intensity of characteristic chicken flavour perceived. |
| Sweetness | The intensity of sweetness perceived. |
| Meaty | The intensity of a basic meat note found in some chicken, pork or lamb, described as earthy. |
| Oily Flavour | The intensity of characteristic chicken fat/oil flavour perceived. |
| Oily Mouthfeel | Degree of oily coating perceived in the mouth. |
| Fishy | The intensity of characteristic oily fish flavour perceived. |

Results:

Diet samples taken at manufacture, start and end of feeding period showed little variation in the fatty acid composition.

Within phases, when considered on a dry matter basis, the chemical composition of the diets were similar.

The mean weight of birds at 15 d is presented in Table 19. There was no difference between the treatments on initial bird liveweight, and there was no significant difference between the pens (P=0.865). The mean feed intake from 15-41 d, weight gain and feed:gain data (total, and adjusted for losses from the pen) are presented in Table 19. The means were adjusted for 15 d weight as a covariate. On an as fed basis, feed intake was lower with FISH than CON, but there was no significant difference in dry matter intake, and no other significant effect of dietary oil on the performance of the birds. Feed intake of the SDA birds was no different from the CON or FISH.

TABLE 19

Feed intake, weight gains and feed:gain performance of the birds from 15-41 d

| | Diet | | | | |
| --- | --- | --- | --- | --- | --- |
| | SDA | CON | FISH | SEM | P |
| Bird liveweight at 15 d (g) | 400 | 397 | 396 | 5.4 | 0.866 |
| Feed intake (g/bird) | 3966$^{ab}$ | 4126$^a$ | 3854$^b$ | 68.9 | 0.044 |
| Feed intake (g DM/bird) | 3540 | 3707 | 3506 | 61.0 | 0.076 |
| Weight gain (g/bird) | 2504 | 2618 | 2570 | 72.8 | 0.553 |
| Total feed:gain | 1.6 | 1.6 | 1.5 | 0.05 | 0.328 |
| Adjusted feed:gain | 1.5 | 1.5 | 1.5 | 0.01 | 0.291 |

$^{a,b}$Within a row, values with different superscripts differ significantly (P < 0.05)

The effect of slaughter age, dietary oil and interaction between slaughter age and dietary oil on the meat yields of the birds is summarised in Table 20. The analysis took into account the 15 d liveweight as a covariate (the means were adjusted for this). There were no significant interactions between slaughter age and diet. The slaughter, dressed and cold carcass weights of birds fed FISH were lower than those of birds fed soya mainly due to the lower feed intake of the birds fed FISH. Birds fed FISH also produced less breast meat, and the yield of total meat and breast meat was lower than in birds fed CON or SDA. The proportion of skin in breast and leg was not affected by diet. In all parameters there was no difference between the SDA and CON birds. Birds fed SDA resulted in better breast and total meat yields as compared to birds fed the fish oil diet.

Overall, SDA was a better source of omega 3's than FISH when looking at bird performance.

TABLE 20

Effect of diet on carcass weights and meat yields of the birds

| | Diet | | | | |
| --- | --- | --- | --- | --- | --- |
| | SDA | CON | FISH | SEM | P |
| Carcass and meat weights (g) | | | | | |
| Slaughter weight | 3661$^{ab}$ | 3711$^a$ | 3513$^b$ | 59.0 | 0.048 |
| Dressed weight | 2752$^{ab}$ | 2808$^a$ | 2602$^b$ | 51.1 | 0.014 |
| Cold carcase weight | 2735$^{ab}$ | 2791$^a$ | 2600$^b$ | 51.5 | 0.028 |
| Breast skin | 81 | 73 | 75 | 2.5 | 0.097 |
| Breast meat | 813$^a$ | 833$^a$ | 740$^b$ | 17.1 | <0.001 |
| Whole leg | 746$^{ab}$ | 755$^a$ | 691$^b$ | 17.2 | 0.020 |
| Leg skin | 75 | 77 | 70 | 2.4 | 0.067 |
| Leg meat | 505 | 522 | 481 | 11.7 | 0.051 |
| Yields of meat (%) | | | | | |
| Dressing % | 75.1 | 75.3 | 73.9 | 0.47 | 0.086 |
| Breast meat yield | 22.1$^a$ | 22.2$^a$ | 21.0$^b$ | 0.24 | <0.001 |
| Leg meat yield | 13.8 | 13.9 | 13.6 | 0.17 | 0.462 |

TABLE 20-continued

Effect of diet on carcass weights and meat yields of the birds

| | Diet | | | | |
| --- | --- | --- | --- | --- | --- |
| | SDA | CON | FISH | SEM | P |
| Total meat yield | 35.9$^a$ | 36.2$^a$ | 34.6$^b$ | 0.31 | 0.001 |
| % skin in breast | 8.5 | 8.8 | 9.0 | 0.21 | 0.232 |
| % skin in leg | 12.9 | 12.9 | 12.7 | 0.29 | 0.793 |

$^{a,b}$Within a row, values with different superscripts differ significantly (P < 0.05)

The fatty acid composition of the skinless breast meat (Table 21), skinless leg meat (Table 22), and breast with skin (Table 23) and leg meat with skin (Table 24) reflected the fatty acid composition of the diet except for the increase in DPA, EPA, and DHA.

SDA has been shown in the literature (James et al., 2003) to be converted to EPA but not to DHA. The increase in DHA observed in this study was unexpected. In the skinless breast meat, skinless leg meat, breast meat with skin and leg meat with skin, the DHA level (mg/100 g tissue) was 2.0, 2.6, 2.1, and 2.0 times higher, respectively, in the tissues of the birds that consumed the SDA soybean oil as compared to those consuming the conventional soybean oil.

EPA and DPA were significantly enriched in the tissues as compared to the tissues from birds fed the conventional soybean oil. This enrichment was due to the conversion of SDA to EPA and the conversion of EPA to DPA.

GLA in the SDA fed birds was elevated about 10 times of that found in the tissues of birds fed the conventional soybean oil. This was due to the high level of GLA in the SDA soybean oil.

In all tissues, the n-6:N-3 ratios were not different between the birds consuming the SDA soybean oil and the fish oil but was significantly better than the birds consuming the conventional soybean oil.

Total n-3 fatty acids (mg/100 g tissue) were significantly higher in the tissues of birds fed SDA soybean oil as compared to the birds fed the conventional soybean oil and fish oil. These levels in a serving of poultry meat (100 g) would provide a significant contribution to the human daily requirement.

The intake (over the grower and finisher period) and tissue pool size of fatty acids for the different diets is summarized in Table 25. Birds fed FISH accumulated (in their edible tissues) 23, 19, 37, 23 and 24% respectively of the C18:4, C20:5, C22:5, C22:6 and LC n-3 PUFA that they consumed. Birds fed CON did accumulate some SDA and LC n-3 PUFA, despite having no detectable amounts of these fatty acids in their diet.

Assuming these fatty acids came from the desaturation and elongation of dietary C18:3, the accumulation of C18:4, C20:5, C22:5, C22:6 and LC n-3 PUFA in the edible tissues of CON birds accounted for 1.3, 0.9, 1.3, 0.8 and 3% respectively of dietary C18:3 consumed. If it is assumed that the C18:3 n-3 consumed by birds fed SDA was similarly converted, and that any other deposited C18:4 and LC n-3 PUFA was derived from dietary C18:4, then dietary C18:4 accounted for the accumulation of 9388, 799, 871, 273 and 1840 mg of C18:4, C20:5, C22:5, C22:6 and LC n-3 PUFA respectively. This accumulation accounts for 18, 1.6, 1.7, 0.5 and 3.6% of the SDA consumed. Accumulation of C18:4 and LC n-3 PUFA by birds fed SDA thus accounted for 21.6% of the C18:4 consumed.

This accumulation of LC n-3 PUFA must result from the conversion of C18:4 n-3 to its longer chain, desaturated analogues because of the negligible intake of preformed LC n-3 PUFA with the SDA diet.

James et al. (2003) suggested that 3 g C18:4 was equivalent to 1 g C20:5. On this basis, the C18:4 accumulated in the breast and leg meat (with skin) of SDA-fed birds would supply the equivalent of an additional 170 and 279 mg LC n-3 PUFA, respectively. The supply of total LC n-3 PUFA equivalents would then be equivalent to 311 and 498 mg/100 g meat. Even in the much less lipid rich tissues of skinless breast and leg meat, the potential contribution from C18:4 from birds fed SDA would provide the equivalent of 164 and 288 mg/100 g meat, respectively. When the concentration of LC n-3 PUFA equivalents were considered, the concentration of LC n-3 PUFA equivalents in skinless breast meat was similar in birds fed either FISH or SDA. Even in the other tissues, the supply of LC n-3 PUFA equivalents was much greater in birds fed SDA compared with CON.

When the fatty acids are expressed on a percent of fatty acids in the tissues, the skinless breast meat from the SDA soybean oil fed birds contained 10.76% SDA, 1.30% EPA, 2.10% DPA and 0.65% DHA as compared to 0.14% SDA, 0.57% EPA, 0.57% DPA and 0.33% DHA of fatty acids from birds fed conventional soybean oil. The skinless leg meat from the SDA soybean oil fed birds contained 10.89% SDA, 1.31% EPA, 1.65% DPA and 0.52% DHA as compared to 0.24% SDA, 0.12% EPA, 0.39% DPA and 0.20% DHA of fatty acids from birds fed conventional soybean oil. The skin from the SDA soybean oil fed birds contained 11.51% SDA, 0.99% EPA, 0.89% DPA and 0.24% DHA as compared to 0.29% SDA, 0.08% EPA, 0.12% DPA and 0.05% DHA of fatty acids from birds fed conventional soybean oil.

TABLE 21

Effect of SDA soybean oil, conventional soybean oil and fish oil on the fat content and fatty acid composition of skinless breast meat.

| Fatty acid | Diet | | | SEM | P |
|---|---|---|---|---|---|
| | SDA | CON | FISH | | |
| Fat content (g/kg) | 39.4 | 39.9 | 29.9 | 2.92 | 0.050 |
| Fatty acid content (mg/100 g fresh tissue) | | | | | |
| C16:0 | 461 | 435 | 351 | 44.2 | 0.223 |
| C16:1 | 63 | 73 | 78 | 9.4 | 0.561 |
| C18:0 | 168 | 151 | 121 | 14.5 | 0.101 |
| C18:1 cis-9 | 499 | 581 | 391 | 49.6 | 0.052 |
| C18:1 trans-11 | 39 | 50 | 48 | 4.19 | 0.174 |
| C18:2 n-6 | $395^a$ | $635^b$ | $223^a$ | 50.3 | <0.001 |
| C18:3 n-6 | $53^b$ | $3^a$ | $2^a$ | 4.1 | <0.001 |
| C18:3 n-3 | $116^b$ | $80^b$ | $31^a$ | 9.8 | <0.001 |
| C18:4 n-3 | $231^b$ | $3^a$ | $13^a$ | 19.0 | <0.001 |
| C20:1 | $2^a$ | $2^a$ | $11^b$ | 1.5 | 0.001 |
| C20:4 n-6 | $24^b$ | $32^c$ | $13^a$ | 2.1 | <0.001 |
| C20:3 | $8^{ab}$ | $15^b$ | $2^a$ | 2.8 | 0.021 |
| C20:5 n-3 | $28^{ab}$ | $12^a$ | $49^b$ | 9.4 | 0.044 |
| C22:4 n-6 | $0.9^a$ | $3.1^b$ | $0.5^a$ | 0.21 | <0.001 |
| C22:5 n-3 | $45^b$ | $12^a$ | $53^b$ | 3.3 | <0.001 |
| C22:6 n-3 | $14^b$ | $7^a$ | $107^c$ | 4.7 | <0.001 |
| SFA[1] | 629 | 587 | 473 | 58.0 | 0.181 |
| MUFA[2] | 602 | 706 | 527 | 62.5 | 0.164 |
| PUFA[3] | $915^b$ | $803^b$ | $495^a$ | 75.1 | 0.004 |
| Total n-3[4] | $434^c$ | $114^a$ | $253^b$ | 33.3 | <0.001 |
| Total n-6[5] | $472^b$ | $670^c$ | $239^a$ | 52.0 | <0.001 |
| n-6:n-3[6] | $1.11^a$ | $6.13^b$ | $0.93^a$ | 0.185 | <0.001 |
| LC n-3 PUFA[7] | $87^b$ | $31^a$ | $209^c$ | 15.0 | <0.001 |
| LC n-3 PUFA equivalents[8] | $164^b$ | $32^a$ | $213^b$ | 17.2 | <0.001 |

[1]Saturated fatty acids
[2]Monounsaturated fatty acids
[3]Polyunsaturated fatty acids
[4]Total n-3 fatty acids
[5]Total n-6 fatty acids
[6]Ratio of n-6:n-3 fatty acids
[7]Total long chain n-3 polyunsaturated fatty acids
[8]Calculated as (C18:4/3) plus total long chain n-3 polyunsaturated fatty acids
$^{a,b,c}$Means within a row with different superscripts differ significantly (P < 0.05)

TABLE 22

Effect of SDA soybean oil, conventional soybean oil and fish oil on the fat content and fatty acid composition of skinless leg meat.

| Fatty acid | Diet | | | SEM | P |
|---|---|---|---|---|---|
| | SDA | CON | FISH | | |
| Fat content (g/kg) | 70.7 | 68.0 | 67.4 | 5.52 | 0.903 |
| Fatty acid content (mg/100 g fresh tissue) | | | | | |
| C16:0 | 838 | 861 | 842 | 82.8 | 0.978 |
| C16:1 | 149 | 180 | 233 | 23.1 | 0.063 |
| C18:0 | 294 | 268 | 256 | 27.7 | 0.629 |
| C18:1 cis-9 | 958 | 1140 | 1001 | 106.1 | 0.470 |
| C18:1 trans-11 | 72 | 94 | 108 | 10.8 | 0.087 |
| C18:2 n-6 | $785^a$ | $1275^b$ | $577^a$ | 115.6 | 0.002 |
| C18:3 n-6 | $103^b$ | $10^a$ | $5^a$ | 7.1 | <0.001 |
| C18:3 n-3 | $231^b$ | $175^b$ | $89^a$ | 21.2 | 0.001 |
| C18:4 n-3 | $442^b$ | $10^a$ | $36^a$ | 33.0 | <0.001 |
| C20:1 | $4^a$ | $2^a$ | $26^b$ | 3.8 | 0.001 |
| C20:4 n-6 | $38^a$ | $53^b$ | $27^a$ | 3.5 | 0.001 |
| C20:3 | 2.1 | 1.5 | 2.4 | 0.42 | 0.306 |
| C20:5 n-3 | $53^b$ | $5^a$ | $141^c$ | 11.3 | <0.001 |
| C22:4 n-6 | $1.5^a$ | $4.6^b$ | $1.2^a$ | 0.23 | <0.001 |
| C22:5 n-3 | $67^b$ | $16^a$ | $104^c$ | 7.1 | <0.001 |
| C22:6 n-3 | $21^a$ | $8^a$ | $185^b$ | 11.9 | <0.001 |
| SFA[1] | 1132 | 1129 | 1098 | 109.8 | 0.970 |
| MUFA[2] | 1183 | 1415 | 1369 | 140.5 | 0.484 |
| PUFA[3] | 1743 | 1558 | 1169 | 158.9 | 0.062 |
| Total n-3[4] | $813^c$ | $214^a$ | $555^b$ | 60.0 | <0.001 |
| Total n-6[5] | $926^{ab}$ | $1338^a$ | $610^a$ | 120.4 | 0.003 |
| n-6:n-3[6] | $0.09^a$ | $6.34^b$ | $1.08^a$ | 0.090 | <0.001 |
| LC n-3 PUFA[7] | $141^b$ | $29^a$ | $430^c$ | 29.8 | <0.001 |
| LC n-3 PUFA equivalents[8] | $288^b$ | $32^a$ | $442^c$ | 33.1 | <0.001 |

[1]Saturated fatty acids
[2]Monounsaturated fatty acids
[3]Polyunsaturated fatty acids
[4]Total n-3 fatty acids
[5]Total n-6 fatty acids
[6]Ratio of n-6:n-3 fatty acids
[7]Total long chain n-3 polyunsaturated fatty acids
[8]Calculated as (C18:4/3) plus total long chain n-3 polyunsaturated fatty acids
$^{a,b,c}$Means within a row with different superscripts differ significantly (P < 0.05)

TABLE 23

Effect of SDA soybean oil, conventional soybean oil and fish oil on the fat content and fatty acid composition of breast meat with skin.

| Fatty acid | SDA | CON | FISH | SEM | P |
|---|---|---|---|---|---|
| Fat content (g/kg) | 75.4$^{ab}$ | 78.8$^b$ | 65.4$^a$ | 2.88 | 0.014 |
| Fatty acid content (mg/100 g fresh tissue) | | | | | |
| C16:0 | 983$^{ab}$ | 1115$^b$ | 877$^a$ | 59.2 | 0.040 |
| C16:1 | 163$^a$ | 219$^b$ | 231$^b$ | 13.0 | 0.005 |
| C18:0 | 327$^b$ | 335$^b$ | 260$^a$ | 17.4 | 0.017 |
| C18:1 cis-9 | 1149$^a$ | 1571$^b$ | 1001$^a$ | 80.1 | 0.001 |
| C18:1 trans-11 | 81$^a$ | 122$^b$ | 110$^b$ | 5.8 | 0.001 |
| C18:2 n-6 | 867$^a$ | 1624$^b$ | 584$^a$ | 77.8 | <0.001 |
| C18:3 n-6 | 121$^b$ | 11$^a$ | 6$^a$ | 3.1 | <0.001 |
| C18:3 n-3 | 262$^b$ | 223$^b$ | 90$^a$ | 12.8 | <0.001 |
| C18:4 n-3 | 522$^b$ | 13$^a$ | 37$^b$ | 14.4 | <0.001 |
| C20:1 | 15$^{ab}$ | 6$^a$ | 24$^b$ | 4.7 | 0.046 |
| C20:4 n-6 | 31$^b$ | 40$^c$ | 22$^a$ | 2.0 | <0.001 |
| C20:3 | 8$^{ab}$ | 15$^b$ | 3$^a$ | 2.9 | 0.039 |
| C20:5 n-3 | 53$^b$ | 13$^a$ | 140$^c$ | 8.4 | <0.001 |
| C22:4 n-6 | 1.1$^a$ | 3.4$^b$ | 1.0$^a$ | 0.19 | <0.001 |
| C22:5 n-3 | 65$^b$ | 15$^a$ | 101$^c$ | 3.5 | <0.001 |
| C22:6 n-3 | 19$^a$ | 9$^a$ | 181$^b$ | 4.4 | <0.001 |
| SFA[1] | 1310$^{ab}$ | 1450$^b$ | 1137$^a$ | 75.8 | 0.035 |
| MUFA[2] | 1408$^a$ | 1947$^b$ | 1367$^a$ | 97.9 | 0.002 |
| PUFA[3] | 1950$^b$ | 1967$^b$ | 1167$^a$ | 105.8 | <0.001 |
| Total n-3[4] | 922$^c$ | 273$^a$ | 550$^b$ | 31.9 | <0.001 |
| Total n-6[5] | 1019$^b$ | 1676$^c$ | 613$^a$ | 80.2 | <0.001 |
| n-6:n-3[6] | 1.11$^a$ | 6.18$^b$ | 1.12$^a$ | 0.061 | <0.001 |
| LC n-3 PUFA[7] | 137$^b$ | 37$^a$ | 422$^c$ | 14.1 | <0.001 |
| LC n-3 PUFA equivalents[8] | 311$^b$ | 41$^a$ | 435$^c$ | 16.0 | <0.001 |

[1]Saturated fatty acids
[2]Monounsaturated fatty acids
[3]Polyunsaturated fatty acids
[4]Total n-3 fatty acids
[5]Total n-6 fatty acids
[6]Ratio of n-6:n-3 fatty acids
[7]Total long chain n-3 polyunsaturated fatty acids
[8]Calculated as (C18:4/3) plus total long chain n-3 polyunsaturated fatty acids
$^{a,b,c}$Means within a row with different superscripts differ significantly (P < 0.05)

TABLE 24

Effect of SDA soybean oil, conventional soybean oil and fish oil on the fat content and fatty acid composition of leg meat with skin.

| Fatty acid | SDA | CON | FISH | SEM | P |
|---|---|---|---|---|---|
| Fat content (g/kg) | 122 | 121 | 113 | 4.9 | 0.354 |
| Fatty acid content (mg/100 g fresh tissue) | | | | | |
| C16:0 | 1590$^{ab}$ | 1800$^b$ | 1521$^a$ | 71.8 | 0.040 |
| C16:1 | 291$^a$ | 379$^b$ | 430$^b$ | 18.9 | <0.001 |
| C18:0 | 521 | 522 | 435 | 25.2 | 0.045 |
| C18:1 cis-9 | 1895$^a$ | 2514$^b$ | 1779$^a$ | 81.5 | <0.001 |
| C18:1 trans-11 | 132$^a$ | 193$^b$ | 189$^b$ | 9.3 | 0.001 |
| C18:2 n-6 | 1457$^b$ | 2637$^c$ | 1042$^a$ | 95.7 | <0.001 |
| C18:3 n-6 | 200$^b$ | 21$^a$ | 11$^a$ | 6.4 | <0.001 |
| C18:3 n-3 | 440$^b$ | 372$^b$ | 165$^a$ | 19.3 | <0.001 |
| C18:4 n-3 | 861$^b$ | 23$^a$ | 68$^a$ | 30.1 | <0.001 |
| C20:1 | 24$^{ab}$ | 7$^a$ | 43$^b$ | 6.7 | 0.008 |
| C20:4 n-6 | 48$^{ab}$ | 62$^b$ | 38$^a$ | 3.0 | <0.001 |
| C20:3 | 2.8 | 3.6 | 4.0 | 0.92 | 0.663 |
| C20:5 n-3 | 87$^b$ | 9$^a$ | 258$^c$ | 7.5 | <0.001 |
| C22:4 n-6 | 1.8$^a$ | 4.9$^b$ | 1.9$^a$ | 0.21 | <0.001 |
| C22:5 n-3 | 95$^b$ | 20$^a$ | 165$^c$ | 5.0 | <0.001 |
| C22:6 n-3 | 29$^a$ | 10$^a$ | 278$^b$ | 8.4 | <0.001 |
| SFA[1] | 2111$^{ab}$ | 2322$^b$ | 1956$^a$ | 95.8 | 0.052 |
| MUFA[2] | 2342$^a$ | 3092$^b$ | 2441$^a$ | 101.1 | <0.001 |
| PUFA[3] | 3221$^b$ | 3161$^b$ | 2030$^a$ | 138.6 | <0.001 |
| Total n-3[4] | 1512$^c$ | 433$^a$ | 934$^b$ | 52.1 | <0.001 |
| Total n-6[5] | 1705$^b$ | 2720$^c$ | 1090$^a$ | 100.8 | <0.001 |
| n-6:n-3[6] | 1.13$^a$ | 6.30$^b$ | 1.17$^a$ | 0.056 | <0.001 |
| LC n-3 PUFA[7] | 211$^b$ | 38$^a$ | 701$^c$ | 20.4 | <0.001 |
| LC n-3 PUFA equivalents[8] | 498$^b$ | 46$^a$ | 724$^c$ | 23.9 | <0.001 |

[1]Saturated fatty acids
[2]Monounsaturated fatty acids
[3]Polyunsaturated fatty acids
[4]Total n-3 fatty acids
[5]Total n-6 fatty acids
[6]Ratio of n-6:n-3 fatty acids
[7]Total long chain n-3 polyunsaturated fatty acids
[8]Calculated as (C18:4/3) plus total long chain n-3 polyunsaturated fatty acids
$^{a,b,c}$Means within a row with different superscripts differ significantly (P < 0.05)

TABLE 25

Effect of diet on the intake and pool sizes of n-3 fatty acids.

| | Diet | | | | Diet | | | |
|---|---|---|---|---|---|---|---|---|
| | SDA | CON | FISH | SEM | SDA | CON | FISH | SEM |
| | Intake of n-3 fatty acids (mg/bird) | | | | Pool size in skinless breast meat (mg/bird) | | | |
| C18:2 | 57761$^b$ | 122387$^c$ | 37731$^a$ | 3536 | 3092$^a$ | 4766$^b$ | 1710$^a$ | 403.0 |
| C18:3 n-6 | 13207$^b$ | 169$^a$ | 123$^a$ | 600 | 414$^b$ | 26$^a$ | 19$^a$ | 35.1 |
| C20:4 | 0$^a$ | 432$^c$ | 86$^b$ | 23 | 188$^b$ | 251$^b$ | 103$^a$ | 17.7 |
| C18:3 n-3 | 19717$^b$ | 17393$^b$ | 6415$^a$ | 628 | 909$^b$ | 603$^b$ | 241$^a$ | 86.0 |
| C18:4 | 51219$^b$ | 0$^a$ | 3133$^a$ | 2200 | 1799$^b$ | 22$^a$ | 99$^a$ | 162.2 |
| C20:5 | 0$^a$ | 0$^a$ | 13724$^b$ | 536 | 225$^{ab}$ | 82$^a$ | 385$^b$ | 68.9 |
| C22:5 | 7$^a$ | 3$^a$ | 4919$^b$ | 203 | 355$^b$ | 91$^a$ | 412$^b$ | 26.3 |
| C22:6 | 0$^a$ | 6$^a$ | 13611$^b$ | 559 | 107$^a$ | 58$^a$ | 847$^b$ | 39.4 |
| Total n-6 | 70968$^b$ | 122989$^c$ | 37940$^a$ | 3520 | 3695$^b$ | 5044$^b$ | 1832$^a$ | 424.1 |
| Total n-3 | 70943$^c$ | 17402$^a$ | 41803$^b$ | 2218 | 3394$^c$ | 856$^a$ | 1982$^b$ | 285.8 |
| n-6:n-3 | 1.0$^b$ | 7.1$^c$ | 0.9$^a$ | 0.0 | | | | |
| Total PUFA | 141911$^b$ | 140784$^b$ | 79743$^a$ | 3736 | 7148$^b$ | 6029$^{ab}$ | 3834$^a$ | 645.5 |
| LC n-3 PUFA | 7$^a$ | 9$^a$ | 32255$^b$ | 1298 | 686$^b$ | 231$^a$ | 1643$^c$ | 118.2 |
| LC n-3 PUFA equivalents | 17080$^b$ | 9$^a$ | 33299$^c$ | 1192 | 1286$^b$ | 238$^a$ | 1676$^b$ | 137.7 |

TABLE 25-continued

Effect of diet on the intake and pool sizes of n-3 fatty acids.

| | Diet | | | | Diet | | | |
|---|---|---|---|---|---|---|---|---|
| | SDA | CON | FISH | SEM | SDA | CON | FISH | SEM |
| | Pool size in skinless leg meat (mg/bird) | | | | Pool size in skin (mg/bird) | | | |
| C18:2 | 6186$^a$ | 10010$^b$ | 4400$^a$ | 934.3 | 47950$^a$ | 90966$^b$ | 33902$^a$ | 3865.1 |
| C18:3 n-6 | 814$^b$ | 80$^a$ | 40$^a$ | 60.0 | 6863$^b$ | 695$^a$ | 362$^a$ | 383.4 |
| C20:4 | 301$^a$ | 410$^b$ | 205$^a$ | 28.8 | 880 | 932 | 892 | 91.2 |
| C18:3 | 1170$^b$ | 852$^b$ | 430$^a$ | 110.5 | 2805$^b$ | 2385$^b$ | 991$^a$ | 199.9 |
| C18:4 | 2240$^b$ | 48$^a$ | 175$^a$ | 183.3 | 5605$^b$ | 157$^a$ | 417$^a$ | 317.5 |
| C20:5 | 268$^b$ | 26$^a$ | 688$^c$ | 46.7 | 483$^b$ | 47$^a$ | 1554$^c$ | 105.8 |
| C22:5 | 339$^b$ | 75$^a$ | 506$^c$ | 30.7 | 433$^b$ | 68$^a$ | 860$^c$ | 57.0 |
| C22:6 | 108$^a$ | 41$^a$ | 905$^b$ | 47.6 | 116$^a$ | 32$^a$ | 1358$^b$ | 102.7 |
| Total n-6 | 7300$^{ab}$ | 10499$^b$ | 4645$^a$ | 977.9 | 55693$^b$ | 92593$^b$ | 35156$^a$ | 4087.0 |
| Total n-3 | 6437$^c$ | 1679$^a$ | 4287$^b$ | 483.4 | 49813$^c$ | 14705$^a$ | 28662$^b$ | 2261.1 |
| Total PUFA | 13766$^c$ | 12226$^b$ | 8962$^a$ | 1296.6 | 105593$^b$ | 107491$^b$ | 63995$^a$ | 5717.0 |
| LC n-3 PUFA | 715$^b$ | 142$^a$ | 2099$^c$ | 120.8 | 1031$^a$ | 147$^a$ | 3772$^b$ | 262.3 |
| LC n-3 PUFA equivalents | 2281$^b$ | 254$^a$ | 3423$^c$ | 229.6 | 15300$^b$ | 1073$^a$ | 21648$^c$ | 1251.0 |

$^{a,b,c}$Within a dataset, means within a row without a common superscript differ significantly (P < 0.05)

The results of the sensory analysis are summarized in Table 26 and Table 27.

Differences that were perceived in the breast meats were associated with the texture and appearance of the meat, but not its flavour, aroma or aftertaste. These differences are related more to birds fed CON, but were because of perceived textural differences. It is unlikely that this was a result of the dietary strategy, and is more likely a reflection of the natural variation in the samples, and is an artifact of the cooking process.

The sensory attributes of the more lipid-rich leg meat, however, were significantly affected by the diet that the birds had been fed (Table 27). Significant fishy aromas, flavours and aftertastes were perceived in both the freshly cooked and reheated meat, and these were most marked in meat from birds fed FISH. Although these fishy attributes were also detected in meat from birds fed SDA, the scores were lower.

In the freshly cooked SDA meat, fishy scores were not significantly different from CON meat. Reheated SDA meat had a more fishy aroma and flavour than reheated CON meat (but was not significantly different from freshly cooked SDA meat), and its fishy aftertaste was not significantly different from freshly cooked CON meat. Reheated FISH meat, on the other hand, had significantly higher scores for all three 'fishy' attributes (aroma, flavour and aftertaste).

A major benefit of birds accumulating dietary C18:4 as C18:4 (rather than as LC n-3 PUFA) may therefore be the greater oxidative stability this confers on the meat.

TABLE 26

Effect of SDA soybean oil, conventional soybean oil and fish oil on the sensory attributes of freshly cooked breast meat.

| | Poultry diet | | | | |
|---|---|---|---|---|---|
| Attributes | CON | SDA | FISH | LSD | p |
| Appearance attributes | | | | | |
| Depth of colour | 44.2$^a$ | 48.1$^a$ | 52.9$^b$ | 4.1 | 0.0013 |
| Texture | 44.6$^a$ | 48.3$^{ab}$ | 52.1$^b$ | 5.2 | 0.0244 |
| Moistness | 60.7 | 59.3 | 53.2 | 7.1 | 0.0915 |

TABLE 26-continued

Effect of SDA soybean oil, conventional soybean oil and fish oil on the sensory attributes of freshly cooked breast meat.

| | Poultry diet | | | | |
|---|---|---|---|---|---|
| Attributes | CON | SDA | FISH | LSD | p |
| Aroma attributes | | | | | |
| Chicken | 55.6 | 54.8 | 56.2 | 5.0 | 0.8331 |
| Degree of Roast | 53.4 | 55.6 | 54.8 | 3.9 | 0.5083 |
| Meaty | 53.7 | 58.4 | 60.1 | 7.5 | 0.2100 |
| Texture attributes | | | | | |
| Hardness | 54.0$^b$ | 44.5$^a$ | 41.3$^a$ | 9.2 | 0.0254 |
| Fibrousnesses | 58.4 | 59.5 | 58.9 | 5.3 | 0.8987 |
| Moistness | 48.2 | 46.9 | 49.0 | 7.0 | 0.8187 |
| Cohesive | 50.4 | 46.1 | 48.6 | 8.8 | 0.6052 |
| Flavour attributes | | | | | |
| Chicken | 53.2 | 51.3 | 52.8 | 5.4 | 0.7584 |
| Degree of Roast | 51.0 | 50.6 | 50.7 | 4.9 | 0.9807 |
| Salt | 9.2 | 10.5 | 9.4 | 2.7 | 0.5716 |
| Sweet | 9.0 | 9.8 | 9.2 | 2.5 | 0.7829 |
| Meaty | 45.4 | 51.9 | 52.5 | 7.8 | 0.1347 |
| Aftertaste attributes | | | | | |
| Chicken | 45.7 | 45.9 | 43.4 | 6.8 | 0.6900 |
| Degree of Roast | 43.1 | 39.9 | 36.0 | 6.6 | 0.1004 |
| Salt | 8.6 | 10.3 | 8.4 | 3.2 | 0.3978 |
| Sweet | 8.5 | 9.6 | 8.9 | 2.1 | 0.5433 |

$^{a,b}$Within a row, values without a common superscript differ significantly (P < 0.05)

TABLE 27

Effect of SDA Soybean oil, conventional soybean oil and fish oil on the sensory attributes of freshly cooked and reheated leg meat.

| Attribute | Freshly cooked meat | | | Reheated meat | | | LSD | P |
|---|---|---|---|---|---|---|---|---|
| | CON | SDA | FISH | CON | SDA | FISH | | |
| Appearance attributes | | | | | | | | |
| Depth of colour | 54.9 | 53.1 | 54.0 | 54.8 | 57.9 | 50.2 | 8.7 | 0.6481 |
| Texture | 53.0 | 50.5 | 51.1 | 56.5 | 49.6 | 51.7 | 9.4 | 0.7369 |
| Moistness | 57.9 | 62.9 | 62.6 | 63.7 | 64.9 | 61.5 | 5.9 | 0.2600 |
| Aroma attributes | | | | | | | | |
| Chicken | 47.8$^b$ | 46.6$^b$ | 42.2$^b$ | 48.3$^b$ | 41.4$^b$ | 29.9$^a$ | 7.3 | <0.0001 |
| Degree of roast | 46.1$^c$ | 45.4$^c$ | 39.6$^{bdc}$ | 45.5$^c$ | 37.1$^{ab}$ | 30.6$^a$ | 8.0 | 0.0012 |
| Meaty | 42.5$^c$ | 36.3$^{abc}$ | 38.2$^{bc}$ | 34.1$^{ab}$ | 30.3$^a$ | 29.1$^a$ | 7.8 | 0.0115 |
| Fishy | 12.7$^a$ | 18.3$^{ab}$ | 29.1$^c$ | 9.1$^a$ | 23.6$^{bc}$ | 51.5$^d$ | 10.7 | <0.001 |
| Oily | 22.3$^a$ | 31.7$^{bc}$ | 36.5$^{bcd}$ | 27.6$^{ab}$ | 38.9$^{cd}$ | 42.3$^d$ | 9.0 | 0.0004 |
| Texture attributes | | | | | | | | |
| Hardness | 44.9 | 43.8 | 47.2 | 45.3 | 46.2 | 40.3 | 8.3 | 0.6386 |
| Fibrousness | 45.8 | 48.5 | 53.8 | 49.5 | 45.9 | 45.0 | 6.2 | 0.0620 |
| Moistness | 57.1 | 58.1 | 53.5 | 55.5 | 55.7 | 57.5 | 7.0 | 0.7936 |
| Cohesive | 41.4 | 46.5 | 48.1 | 47.7 | 42.6 | 41.5 | 6.3 | 0.0940 |
| Oily mouthfeel | 38.6 | 41.7 | 34.8 | 38.1 | 44.4 | 45.1 | 11.1 | 0.4013 |
| Flavour attributes | | | | | | | | |
| Chicken | 49.2$^b$ | 44.6$^b$ | 42.7$^b$ | 45.5$^b$ | 42.5$^b$ | 31.5$^a$ | 8.0 | 0.0019 |
| Degree of roast | 49.3$^c$ | 41.8$^{bc}$ | 41.8$^{bc}$ | 43.4$^{bc}$ | 35.8$^{ab}$ | 29.3$^a$ | 8.6 | 0.0008 |
| Salt | 9.3 | 9.3 | 8.8 | 7.9 | 8.7 | 10.4 | 2.5 | 0.4970 |
| Sweet | 7.1 | 6.9 | 6.4 | 8.1 | 6.9 | 7.2 | 2.3 | 0.7794 |
| Meaty | 39.6 | 38.5 | 37.9 | 32.4 | 31.6 | 30.8 | 8.2 | 0.1184 |
| Fishy | 11.8$^{ab}$ | 20.1$^{abc}$ | 23.0$^{bc}$ | 10.7$^a$ | 29.0$^c$ | 51.3$^d$ | 11.2 | <0.0001 |
| Aftertaste attributes | | | | | | | | |
| Chicken | 42.1$^c$ | 38.6$^{bc}$ | 37.0$^{bc}$ | 42.3$^c$ | 34.6$^b$ | 27.2$^a$ | 7.21 | 0.0011 |
| Degree of roast | 39.3$^c$ | 32.7$^{bc}$ | 33.0$^{bc}$ | 38.6$^c$ | 29.4$^{ab}$ | 23.8$^a$ | 7.3 | 0.0009 |
| Salt | 11.0 | 8.5 | 8.6 | 7.7 | 8.2 | 9.4 | 2.6 | 0.1770 |
| Sweet | 8.3 | 7.0 | 7.3 | 7.3 | 6.6 | 6.1 | 1.3 | 0.0536 |
| Meaty | 34.5 | 32.4 | 31.8 | 29.1 | 25.6 | 28.7 | 6.2 | 0.0848 |
| Oily taste | 31.9$^a$ | 31.7$^a$ | 34.6$^a$ | 31.3$^a$ | 37.7$^a$ | 45.7$^b$ | 7.0 | 0.0009 |
| Oily mouthfeel | 35.9$^{ab}$ | 34.5$^a$ | 36.5$^{ab}$ | 33.8$^a$ | 42.5$^{bc}$ | 46.0$^c$ | 7.7 | 0.0125 |
| Fishy | 12.1$^{ab}$ | 14.5$^{abc}$ | 22.5$^c$ | 9.2$^a$ | 18.8$^{bc}$ | 45.9$^d$ | 9.4 | <0.0001 |

$^{a,b,c,d}$Within a row, values without a common superscript differ significantly (P < 0.05)

Conclusion: Feeding broilers with SDA-enriched soya oil had no effect on their performance or carcass composition, but resulted in significant enrichment of the tissues with C18:4, and accumulation of the long chain n-3 PUFA C20:5 and C22:5. The amount of LC n-3 PUFA equivalent that may be supplied in this way to humans consuming this meat would be approximately 164, 288, 311 and 498 mg/100 g meat from skinless breast, skinless leg, breast (with skin) and leg (with skin) meat respectively. Although feeding birds SDA enriched soya oil did not result in as much LC n-3 PUFA enrichment in the meat as was achieved by feeding the birds fish oil, the sensory attributes of the SDA-fed birds were superior, with significantly lower fishy notes being perceived in the SDA-meat. The use of SDA enriched soya oil in poultry diets therefore offers a means of producing LC n-3 PUFA enriched meat, without some of the problems associated with the cost, security of supply and poor sensory attributes of the meat that are encountered when fish oil is used.

EXAMPLE 4

Poultry Egg Products (SDA Ethyl Ester)

Production of N-3 Fatty Acid Rich Eggs by Chickens fed and SDA Enriched Diet.

A study was conducted to determine whether laying hens fed a diet enriched in stearidonic acid could produce eggs with elevated levels of beneficial omega-3 fatty acids including EPA and DHA.

Mature laying hens (128) were randomly allotted to seven dietary treatments (16 hens/treatment) and were fed diets containing the following levels of n-3 fatty acids as described in Table 28 for four weeks.

TABLE 28

Dietary treatments for laying hens fed n-3 enriched diets.

| Treatment | Description |
|---|---|
| 1 | Control |
| 2 | 0.16% DHA - Ethyl Esters |
| 3 | 0.33% DHA - Ethyl Esters |
| 4 | 0.42% SDA - Ethyl Esters |
| 5 | 0.83% SDA - Ethyl Esters |
| 6 | 0.93% alpha-Linolenic Acid - Ethyl Esters |
| 7 | 1.86% alpha-Linolenic Acid - Ethyl esters |

The percent of DHA, SDA, and ALA ethyl esters refers to the percentage of the diet made up by such components. The DHA, SDA, and ALA ethyl esters were purchased from KD Pharma Bexbach GmbH, Bexbach, Germany.

Sixteen birds were given each treatment. Four birds were randomly selected out of the 16 per treatment to obtain eggs during week 4 for fatty acid composition. The power of the test was sufficient to detect a difference of 0.2% in total omega-3 at a P=0.05. The laying hens had ad libitum access to feed and water. The composition of the diets (Table 29) and premixes (Table 30) are provided below.

TABLE 29

Composition (% of diet) of Layer Diets

| Ingredient | Control % | DHA Ethyl Ester | | SDA Ethyl Ester | | ALA Ethyl Ester | |
|---|---|---|---|---|---|---|---|
| | | 0.163% % | 0.326% % | 0.416% % | 0.832% % | 0.932% % | 1.864% % |
| Basal Diet-Layer[1] | 82.14 | 82.14 | 82.14 | 82.14 | 82.14 | 82.14 | 82.14 |
| Premix-Control | 17.86 | | | | | | |
| Premix - 0.910% DHA EE | | 17.86 | | | | | |
| Premix - 1.825% DHA EE | | | 17.86 | | | | |
| Premix - 2.332% SDA EE | | | | 17.86 | | | |
| Premix - 4.659% SDA EE | | | | | 17.86 | | |
| Premix - 5.216% ALA EE | | | | | | 17.86 | |
| Premix - 10.44% ALA EE | | | | | | | 17.86 |

[1]Corn (48.2%), 48% de-hulled SBM (23.10%), wheat middlings (12.20%), salt (0.60%), Calcium carbonate (11.30%), di-calcium phosphate (2.07%), Trace mineral PMX (0.00%).

TABLE 30

Composition (% of Premix) of Layer Premixes

| Ingredient | Control % | DHA Ethyl Ester | | SDA Ethyl Ester | | ALA Ethyl Ester | |
|---|---|---|---|---|---|---|---|
| | | 0.910% % | 1.825% % | 2.332% % | 4.659% % | 5.216% % | 10.438% % |
| Corn | 87.500 | 87.500 | 87.500 | 87.500 | 87.500 | 87.500 | 87.500 |
| Tallow | 12.000 | 10.989 | 9.972 | 8.668 | 5.344 | 6.204 | 0.402 |
| DHA-Ethyl Esters (90)% | — | 1.011 | 2.028 | — | — | — | — |
| SDA-Ethyl Esters (70)% | — | — | — | 3.332 | 6.656 | — | — |
| ALA-Ethyl Esters (90)% | — | — | — | — | — | 5.796 | 11.598 |
| Rendox | 0.500 | 0.500 | 0.500 | 0.500 | 0.500 | 0.500 | 0.500 |
| Total | 100.000 | 100.000 | 100.000 | 100.000 | 100.000 | 100.000 | 100.000 |

To help prevent oxidation of the fatty acids, 0.05% ethoxyquin (Rendox) was added to each premix. Premixes were manufactured within 3 days of arrival of ethyl esters. To limit the oxidation associated with storage, diets were manufactured once and stored in a refrigerated cooler at 4° C. during the duration of the study.

Eggs collected during week 49 (days 22-28) were maintained under refrigerated conditions until all eggs for that week were collected. Eggs were sorted by hen and treatment.

Two eggs per hen from 4 hens per treatment were taken. The two eggs were weighed individually, cracked and the shell weighed. The difference between fresh egg and shell represented liquid egg weight and served as the basis for further calculations. The liquid fraction from each of the two eggs per hen were combined in a sample cup and homogenized. Samples were analyzed for fatty acids by gas chromatography. The long chain fatty acid composition of the eggs is presented in Table 31.

TABLE 31

Long Chain Fatty Acid Composition (Fatty Acid TAG Equivalent) of Eggs from Chickens fed Control, DHA, SDA and ALA.

| Parameter | Control | DHA Ethyl Ester | | SDA Ethyl Ester | | ALA Ethyl Ester | |
|---|---|---|---|---|---|---|---|
| | | 0.163% | 0.326% | 0.416% | 0.832% | 0.932% | 1.864% |
| ALA (C18:3 n-3), mg/100 g | 25 | 40 | 40 | 42.5 | 55 | 267.5 | 622.5 |
| SDA (C18:4 n-3), mg/100 g | ND | ND | ND | 10 | 25 | ND | 2.5 |
| EPA (C20:5 n-3), mg/100 g | ND | ND | 10 | 10 | 22.5 | 7.5 | 12.5 |

TABLE 31-continued

Long Chain Fatty Acid Composition (Fatty Acid TAG Equivalent)
of Eggs from Chickens fed Control, DHA, SDA and ALA.

| Parameter | Control | DHA Ethyl Ester | | SDA Ethyl Ester | | ALA Ethyl Ester | |
|---|---|---|---|---|---|---|---|
| | | 0.163% | 0.326% | 0.416% | 0.832% | 0.932% | 1.864% |
| DPA (C22:5 n-3), mg/100 g | 5 | 10 | 10 | 35 | 60 | 22.5 | 32.5 |
| DHA (C22:6 n-3), mg/100 g | 42.5 | 177.5 | 247.5 | 150 | 182.5 | 132.5 | 155 |
| Total omega 3's, mg/100 g | 72.5 | 227.5 | 307.5 | 247.5 | 360 | 430 | 825 |
| Omega 6/Omega 3 ratio | 16.3 | 5.7 | 3.8 | 5.0 | 3.7 | 2.9 | 1.5 |

Each value represents mg/100 g total egg, with a mean of 4;
ND = not detected

According to a preferred embodiment of the current disclosure SDA dietary supplementation was about 4.5 times more effective in increasing effective DHA/EPA levels in eggs than ALA. Per unit, SDA was more effective than ALA in increasing EPA, DPA and DHA in eggs. There was no significant accumulation of SDA or DPA in eggs with ALA enrichment. However, consumption of SDA in the diet of laying hens resulted in an enrichment of SDA, EPA, DPA and DHA in the eggs they produced.

The current disclosure also provided these omega-3 enhancements without any discernable negative commercial effects. That is, the shelf-life of eggs from the SDA enriched treatment was normal. The day 60 eggs from the SDA treatment showed no difference in oxidative rancidity from the control as measured by thiobarbituric acid (TBA) assays. There was no statistical difference between the oxidative rancidity of the eggs from the SDA treatment and the eggs from the DHA treatment as of day 68.

REFERENCES

The references cited in this application, both above and below, are specifically incorporated herein by reference.
1. PATRICIA C. ALLEN and HARRY D. DANFORTH. (1998), *Effects of Dietary Supplementation with n-3 Fatty Acid Ethyl Esters on Coccidiosis in Chickens*, POULTRY SCIENCE 77:1631-1635.
2. Ajuyah, A. O.; K. H. Lee; R. T. Hardin and J. S. Sim. (1991), *Changes in the yield and in the fatty acid composition of whole carcass and selected meat portions of broiler chickens fed full-fat oil seeds*. POULTRY SCIENCE, 70:2304-2314.
3. ARACHCHIGE Premakumara G.; TAKAHASHI Yoko; IDE Takashi. (2006), *Dietary Sesamin and Docosahexaenoic and Eicosapentaenoic Acids Synergistically Increase the Gene Expression of Enzymes Involved in Hepatic Peroxisomal Fatty Acid Oxidation in Rats. Metab. Clin. Exp.*, 55:381-90.
4. Calder, P. C. and Field, C. J. (2002). *Fatty Acids, Inflammation and Immunity*. IN: NUTRITION AND IMMUNE FUNCTION, (P. C. Calder, C. J. Field and H. S. Gill (Eds)). CABI Publishing. pp: 57-92.
5. Harris W S, DiRienzo M A, Sands S A, George C, Jones P G, and Eapen, A K (2007) *Stearidonic Acid Increases the Red Blood Cell and Heart Eicosapentaenoic Acid Content in Dogs*, Lipids 42:325-33.
6. James, M. J., Ursin V. M., and Cleland L. G. (2003) *Metabolism of stearidonic acid in human subjects: comparison with the metabolism of other n-3 fatty acids*. AM J CLIN NUTR 2003; 77: 1140-5.
7. Klasing, K. C. and Leshchinsky, T. V., (2000), *Interactions Between Nutrition And Immunity. Lessons From Animal Agriculture*. IN: NUTRITION AND IMMUNOLOGY: PRINCIPLES AND PRACTICE. (M. E. Gershwin, J. B. Germanand, C. L. Keen (Eds)). Elsevier. pp: 363-73.
8. Krasicka, B.; Kulasek, G. W.; Swierczewska E.; and Orzechowski, A. (2000). *Body gains and fatty acid composition in carcasses of broilers fed diets enriched with full-fat rapesee and/or flaxseed*, ARCH. GEFLηGELK., 64:61-69.
9. Krokhan H E, Bjerve K S, Mork E. 1993. *The enteral bioavailability of eicosapentaenoic acid and docosahexaenoic acid is as good from ethyl esters as from glyceryl esters in spite of lower hydrolytic rates by pancreatic lipase in vitro*. BIOCHIM BIOPHYS ACTA, (1993) May 20; 1168(1): 59-67.
10. Lawson, L. D. and Hughs, B. G. (1998) *Absorption of eicosapentaenoic acid and docosahexaenoic acid from fish oil triacylglycerols or fish oil ethyly esters co-ingested with a high-fat meal*, Biochemical and Biophysical Research Communications 156(2): 960-963.
11. Lôpez-Ferrer, S. M. D. Baucells, A. C. Barrota, J. Galobart, and M. A. Grashorn. (2001). (n-3 enrichment of chicken meat.) *Use of precursors of long-chain polyunsaturated fatty acids in Linseed oil*, POULTRY SCIENCE 80:753-761.
12. Martinez M. et al., (2000), *Therapeutic effects of docosahexaenoic acid ethyl ester in patients with generalized peroxisomal disorders*. AMERICAN JOURNAL OF CLINICAL NUTRITION, Vol. 71, No. 1, 376S-385S.
13. Mattos R., C R Staples, and W W Thatcher, *Effects of Dietary Fatty Acids on Reproduction In Ruminants*, (2000), REVIEWS OF REPRODUCTION 5:38-45.
14. Miles E A, Banerjee T. and Calder, P. C. (2004), *The influence of different combinations of gamma-linolenic acid, stearidonic acid and EPA on immune function in healthy young male subjects*. BR J NUTR. 2004 June; 91(6): 893-903.
15. Napier, Johnathan. (2007) *The Production of Unusual Fatty Acids in Transgenic Plants*. ANNU. REV. PLANT BIOL., 2007 58:295-319.
16. Sun-Young Lim and Hiramitsu Suzuki. (2000), *Intakes of Dietary Docosahexaenoic Acid Ethyl Ester and Egg Phosphatidylcholine Improve Maze-Learning Ability in Young and Old Mice*. JOURNAL OF NUTRITION. 2000; 130:1629-1632.
17. Ursin G. et al., (2003), *Modification of plant lipids for human health: Development of functional land-based omega-3 fatty acids*. J. NUTR. 133:4271-4274.

What is claimed is:

1. A poultry feed comprising
   a. stearidonic acid (SDA);
   b. gamma linolenic acid (GLA); and
   c. additional feed components;
wherein said poultry feed comprises at least about 0.5 wt. % SDA and at least about 0.1 wt. % GLA.

2. The poultry feed of claim 1 wherein said feed further comprises a transgenic plant product selected from the group consisting of transgenic soybean, transgenic soybean oil, transgenic soy protein, transgenic corn, and transgenic canola.

3. The poultry feed of claim 1 that further comprises alpha-linolenic acid (ALA).

4. The poultry feed of claim 3 wherein the ALA concentration is less than about 25% of the total fatty acid content of the poultry feed.

5. The poultry feed of claim 3 wherein the ratio of SDA/ALA is at least about 0.5.

6. The poultry feed of claim 1 that further comprises eicosenoic acid.

7. The poultry feed of claim 6 wherein the eicosenoic acid concentration is less than about 0.7%.

8. The poultry feed of claim 6 wherein the ratio of SDA/eicosenoic acid is at least about 20.

9. The poultry feed of claim 1 wherein said SDA concentration is less than about 35% of the total fatty acids in the feed.

10. The poultry feed of claim 1 further comprising 6-cis, 9-cis, 12-cis, 15-trans-octadecatetraenoic acid.

11. The poultry feed of claim 1, further comprising 9-cis, 12-cis, 15-trans-alpha linolenic acid.

12. The poultry feed of claim 1, further comprising 6, 9-octadecadienoic acid.

13. The poultry feed of claim 1 further comprising tocochromanol.

14. The poultry feed of claim 13 comprising at least about 10 ppm tocochromanol.

15. The poultry feed of claim 14 wherein said tocochromanol is tocopherol.

16. The poultry feed of claim 1 wherein said additional feed components are selected from the group consisting of salt, an antibiotic, corn, wheat, oats, barley, soybean meal, cottonseed meal, flaxseed meal, canola meal, a fish product, an algal product, an animal byproduct, wheat middlings, wheat bran, rice bran, corn distiller dried grains, brewers grains, corn gluten meal, corn gluten feed, molasses, rice mill byproduct, corn oil, flax oil, soy protein, palm oil, animal fat, poultry fat, restaurant grease, an antioxidant, tocochromanol tocopherol, a vitamin, a mineral, an amino acid, and a coccidostat.

17. The poultry feed of claim 1 wherein the poultry feed comprises a transgenic soybean oil comprising SDA.

18. The poultry feed of claim 17 wherein the poultry feed comprises at least 0.8 wt. % SDA.

19. The poultry feed of claim 17 wherein the poultry feed comprises at least 1.5 wt. % SDA.

20. The poultry feed of claim 17 wherein the poultry feed comprises from 1.08 wt. % to 1.2 wt. % SDA.

21. The poultry feed of claim 1 wherein the poultry feed comprises from 4.5 wt. % to 5 wt. % transgenic soybean oil having 24.1 wt. % SDA based on the total weight of the fatty acids.

* * * * *